(12) United States Patent
Dick et al.

(10) Patent No.: US 7,856,866 B2
(45) Date of Patent: Dec. 28, 2010

(54) METHOD OF OPERATING AN ATOMIC FORCE MICROSCOPE IN TAPPING MODE WITH A REDUCED IMPACT FORCE

(75) Inventors: Andrew James Dick, Houston, TX (US); Balakumar Balachandran, Rockville, MD (US); Hiroshi Yabuno, Tokyo (JP); Masatoshi Numatsu, Miyagi (JP); Keiichi Hayashi, Tsukuba (JP); Masaharu Kuroda, Tsukuba (JP); Kiwamu Ashida, Tsukuba (JP)

(73) Assignees: University of Maryland, College Park, MD (US); National Institute of Advanced Industrial Science and Technology, Ibaraki (JP)

( * ) Notice: Subject to any disclaimer, the term of this patent is extended or adjusted under 35 U.S.C. 154(b) by 617 days.

(21) Appl. No.: 11/851,110

(22) Filed: Sep. 6, 2007

(65) Prior Publication Data

US 2009/0064771 A1    Mar. 12, 2009

(51) Int. Cl.
    *G01B 5/28* (2006.01)
(52) U.S. Cl. .......................................................... 73/105
(58) Field of Classification Search ...................... None
    See application file for complete search history.

(56) References Cited

U.S. PATENT DOCUMENTS 5,412,980 A    5/1995   Elings et al.

*Primary Examiner*—Robert R Raevis
(74) *Attorney, Agent, or Firm*—Rosenberg, Klein & Lee

(57) ABSTRACT

In a tapping mode Atomic Force Microscope (AFM) system, a probe is excited at an excitation frequency other than the probe's first natural frequency to produce a response signal manifesting a grazing bifurcation between "non-collision" and "collision" states of the AFM system, so that an additional characteristic frequency component is generated in the "collision" state. The magnitude of the additional characteristic frequency component is monitored in real time, and the probe-sample separation is adjusted to maintain the monitored magnitude at an optimal value to operate the AFM system at near-grazing conditions.

16 Claims, 18 Drawing Sheets

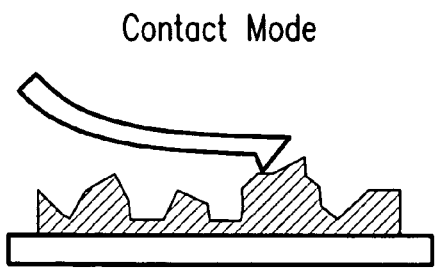
FIG.1A — Contact Mode
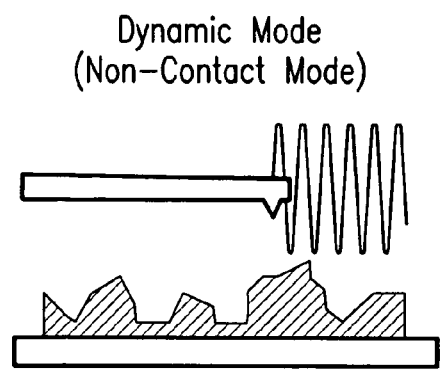
FIG.1B — Dynamic Mode (Non-Contact Mode)
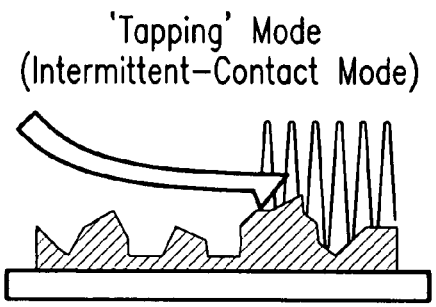
FIG.1C — 'Tapping' Mode (Intermittent-Contact Mode)

METHOD OF OPERATING AN ATOMIC FORCE MICROSCOPE IN TAPPING MODE WITH A REDUCED IMPACT FORCE

FIELD OF THE INVENTION

The present invention is related to microscopy; and in particular to an Atomic Force Microscopy (AFM).

More in particular the present invention relates to an Atomic Force Microscope operated in a tapping mode with reduced impact force.

The present invention also is directed to a method of operating an AFM in a tapping mode in which the probe of the Atomic Force Microscope is excited at a frequency distinct from the probe's first natural frequency to produce a response characterized by a grazing bifurcation with a manifestation of a grazing event, e.g., of a transition from a "non-collision" state (prior to contact of the probe with the sample) to a "collision" state (when the probe is periodically colliding with the sample surface).

Under these conditions, the response signal reveals a characteristic frequency component in the "collision" state which is not found if the probe oscillates at its first natural frequency. A real-time response signal of the AFM system is processed to extract a value of the characteristic frequency component and to adjust the distance between the probe and the sample in order to maintain the sample-probe separation at an optimal distance corresponding to the probe grazing. This provides a favorable regime of operation with reduced impact force between the probe and the sample, thus providing an undamaging mode of operation applicable even to delicate specimens under the study.

BACKGROUND OF THE INVENTION

Atomic Force Microscopes (AFMs) belong to high resolution type of scanning probe microscopes with resolutions in the range of fractions of a nanometer. In the Atomic Force Microscopy, a microscale cantilever with a sharp tip (probe) at its end is used to scan the surface of a sample. When the tip is brought into proximity of a sample surface, the forces between the tip and the sample lead to a deflection of the cantilever in accordance with Hooke's Law. Typically, the deflection of the cantilever is measured to obtain the sample's topography.

The AFM may be operated in a number of imaging modes, including contact modes (also called static modes) and a variety of dynamic modes. In the contact mode of operation, shown in FIG. 1A, the static tip deflection is used as a feedback signal. Due to the tendency of a static signal to be noisy and drift, low stiffness cantilevers are used to boost the deflection signal. However, close to the surface of the sample, attractive forces may be strong, causing the tip to collide with the surface of the sample, thereby damaging the specimen and resulting in an inaccurate measurement.

In the dynamic (Non-Contact) mode, shown in FIG. 1B, the cantilever is externally oscillated at or close to its resonance frequency. The oscillation amplitude, phase and resonance frequency are modified by tip sample interaction forces. These changes in oscillation parameters with respect to the external reference oscillation provide information about the sample's characteristics. Schemes for dynamic mode operation include frequency modulation and the more common, amplitude modulation. In frequency modulation, changes in the oscillation frequency provide information about tip-sample interactions. In amplitude modulation, changes in the oscillation amplitude or phase provide a feedback signal for imaging.

Amplitude modulation may be operated either in the Non-Contact or in the Intermittent Contact regime, also known as a tapping mode, shown in FIG. 1C. In the tapping mode, the cantilever is periodically oscillated such that it comes in contact with the sample with each oscillation cycle, and then a restoring force is provided by the cantilever spring to detach the tip from the sample. In the tapping mode, the cantilever is driven to oscillate vertically near its resonance frequency by a small piezoelectric element mounted in the AFM tip holder (not shown in the Drawings). Due to the interaction forces acting on the cantilever when the tip comes close to the surface of the sample, the amplitude of the oscillation decreases.

An electronic servomechanism is typically used to control the height of the cantilever above the sample to maintain a continuous oscillation amplitude as the cantilever is scanned over the sample surface. The tapping AFM image (response) is produced by imaging the contact force between the tip and the sample surface.

For example, U.S. Pat. No. 5,412,980 describes a tapping Atomic Force Microscope in which a probe tip is oscillated at a resonance frequency and at an amplitude set point. The probe tip is scanned across the surface of a sample in contact with a sample, so that the amplitude of oscillation of the probe is changed in relation to the topography of the surface of the sample. The set point amplitude of oscillation of the probe is maintained greater than 10 nm to ensure that the energy in the cantilever is much higher than that lost in each cycle as the result of the impact of the probe of the sample surface, which avoids sticking of the probe tip to the sample surface. The imaging data either corresponds to a control signal produced to maintain the established amplitude or is a function of changes in the amplitude of oscillation of the probe.

The tapping mode of operation of the AFM as described in '980 Patent, is intended to avoid sticking of the probe tip to the sample surface. However, the problem may still persist when the tapping AFM is used for measurements of soft materials, i.e., biological specimen, where an elastic collision may occur, also known as "soft impact". In this situation, the exact determination of the moment when collisions begin is not attainable. The failure to control the impact force in the precise manner may cause damage to the specimen or result in inaccurate measurements.

Therefore, it is desirable to precisely identify the moment of the beginning of the impact (aka a grazing event, when the probe just touches the sample surface with zero velocity) in order to operate the Atomic Force Microscope in the tapping mode with the reduced impact force between the probe and sample during a collision.

SUMMARY OF THE INVENTION

It is therefore an object of the present invention to provide an operable Atomic Force Microscope which reduces impact force between the probe and sample during collision to permit measurements of delicate specimens and soft materials.

It is another object of the present invention to provide an Atomic Force Microscope operated in the tapping mode in which the separation between the probe and the sample under study is precisely controlled to reduce the impact force between the probe and the sample based on a response signal indicative of a grazing event, e.g., a the transition between the "pre-impact" state and the "impact" state.

A further object of the present invention is to provide a method of operation of an Atomic Force Microscope in which the probe is externally oscillated with an excitation frequency in a frequency window distinct from the probe's first natural frequency for generating a response undergoing a grazing bifurcation so that the generated response contains a frequency component precisely indicating the transition event between "non-contact" and "contact" periods of the AFM operation.

It is another object of the present invention to provide a method for operating of an Atomic Force Microscope at a frequency with a value about 2.5 times the probe's first natural frequency so that the transition from "no collisions" to "periodic impact" is marked by a qualitative change in the response of the AFM probe which can be easily monitored and used to adjust the separation between the probe and the sample surface to a position in which the probe will collide with the sample with extremely low velocities and with very small contact forces. By minimizing the magnitude of the impact forces, it is possible to study extremely soft and/or delicate biological samples which otherwise may be damaged or deformed.

A further object of the present invention is to provide a control scheme for operating the tapping mode Atomic Force Microscope to attain a favorable (reduced impact) mode of operation based on a response signal component indicative of grazing event between the probe and the sample.

The present method of operating the AFM system in the tapping mode includes the steps of:

oscillating the probe at an excitation frequency in a predetermined frequency window distinct from said probe's first natural frequency (preferably 2.5 times the probe's first natural frequency);

disposing the oscillating probe a separation distance from said sample under study for repetitive collisions of the probe therewith, wherein the probe undergoes at least one grazing event between a "non-collision" state and a "collision" state thereof. At the chosen excitation frequency, the generated response signal undergoes grazing bifurcation and includes a unique characteristic frequency component in the "collision" state;

monitoring a magnitude of said characteristic frequency component of the response signal in real time at approximately ½ of the excitation frequency;

defining an optimal magnitude of the characteristic frequency component corresponding to at least one grazing event; and adjusting the separation distance between the probe and the sample to maintain the magnitude of the characteristic frequency component measured in real time substantially equal to the optimal magnitude. The impact forces between the probe and the sample may be reduced during the "collision" state in the present method.

The present tapping mode Atomic Force Microscope (AFM) system includes a cantilever beam supported by a base (cantilever holder) at one end and having a probe at another end;

a control unit controlling a separation distance between the sample under study and the probe for repetitive collisions permits at least one grazing event between a "non-collision" and "collision" states of the system;

an excitation unit for oscillating the probe at an excitation frequency different than the probe's first natural frequency (for example, 2.5 times the probe's first natural frequency) generates a response signal which undergoes a grazing bifurcation, wherein in the "collision" state of the probe the response signal includes a characteristic frequency component;

a data acquiring unit collecting the response signal in real time; and a processing unit which processes the acquired signals.

A monitoring unit is operatively coupled to the processing unit and operates to monitor the magnitude of the characteristic frequency component of the real time response signal.

A servo-control mechanism of the control unit is coupled to the monitoring unit and receives at an input, an optimal value of a magnitude of the characteristic frequency component corresponding to the grazing event. The servo-control unit is coupled to the processing unit to generate adjustment parameters for adjustment of the probe-sample separation to maintain the magnitude of the characteristic frequency component of the real time response signal substantially at the optimal magnitude value corresponding to the grazing event, thereby maintaining the AFM system at near-grazing state to reduce impact forces between the probe and the sample.

These and other features and advantages of the present invention will become apparent after reading a further description of the preferred embodiment in conjunction with accompanying Patent Drawings.

BRIEF DESCRIPTION OF THE DRAWINGS

FIGS. 1A-1C are schematic representations of the principles underlying the contact mode (FIG. 1A), dynamic mode (FIG. 1B), and tapping mode (FIG. 1C) of operation of the AFM of the prior art;

DESCRIPTION OF THE PREFERRED EMBODIMENT

Figure 2:
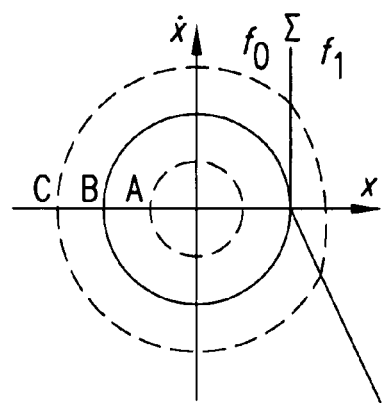
FIG. 2 is a phase diagram representing response conditions for an impact system.

The present method of operation for an Atomic Force Microscope (AFM) is a modification to the Intermittent-Contact mode Atomic Force Microscopy (IC-AFM), a.k.a. the "tapping" mode AFM which is used to study the surface of a sample with very high resolution by oscillating the AFM probe in a manner that the probe tip collides with the sample once per oscillation cycle.

The standard tapping operating procedure where the probe is oscillating at approximately the probe's first natural (fundamental) frequency is modified in the present approach so that the AFM probe is vibrated in a frequency window different from the probe's first natural frequency to generate a system response manifesting a grazing bifurcation. This is a qualitative change in the system's response resulting from a transition through the grazing condition when contact between the probe and sample occurs with zero velocity. The new excitation frequency window has been obtained by the Applicants of the present Patent Application as the result of extensive studies and experimentations.

By using a novel frequency value, which is preferably between the probe's first and second natural frequencies, a more complex response is produced in the present method, which contains a component accurately indicating the transition event between the non-constraining (no-collision) and the constraining (collision) states of the AFM system.

By oscillating the probe at the oscillating frequency between the first and second natural probe's frequencies, for example, at 2.5 times the probe's first natural frequency, a unique phenomenon is produced, whereby the response of the system undergoes a bifurcation from a period-one response (prior to the contact of the probe with the sample) to a period-two response (when the probe periodically collides with the sample surface).

When the probe is excited at a frequency value of about 2.5 times the first natural (fundamental) frequency and its motion is not impeded by the sample surface, the probe oscillates with a frequency and period equal to those of the excitation. If, however, probe-sample separation is changed to allow the oscillating probe to collide with its surface in a periodic fashion, the behavior of the probe changes drastically. The response produced under these conditions has a significant frequency component at the excitation frequency as well as an additional frequency component, also referred to herein as a characteristic frequency component, at one-half of the excitation frequency. The presence of the characteristic frequency component corresponds to the response of the AFM probe requiring two periods of excitation to complete one cycle.

This drastic change in the response of the system is observable in the displacement time series and even more easily detectable within a frequency spectrum calculated from the data as will be presented in further paragraphs. By monitoring (in real-time) the response's characteristic frequency component at half the oscillation frequency and by adjusting the probe-sample separation accordingly, the magnitude of the impact force may be reduced during system operation, thereby making the present method applicable to measurements of delicate specimens, such as, for example, biological structures.

A control scheme has been developed, shown in FIGS. 3B, 6, and 18-20 to monitor the characteristic frequency component to determine the critical separation distance corresponding to the grazing event and to adjust the sample position in order to approach the ideal conditions for probe-sample impact in the present AFM system.

The dynamic behavior of a flexible cantilever beam has been studied to compare the unconstrained response with the system's response when a compliant material is positioned within the range of motion of the beam tip to cause periodic 'soft' impacts. It has been found that a system, such as the one where "soft impacts" occur, can be successfully modeled with a piecewise linear representation of the system's stiffness and damping. The difference between the system's response for unconstrained conditions (no-collision) and constrained conditions (collisions) has been examined in an effort to develop the present operating method of the AFM system to determine the critical separation distance corresponding to grazing between the center of excitation of the beam (cantilever) and the surface of the contact material.

Examples of some different response conditions for an impact system are presented as phase diagrams in FIG. 2 for a single-degree-of-freedom system. The periodic response represented by the curve "A" is an example of the system's behavior for unconstrained conditions, where the oscillator is free to vibrate harmonically. The system's behavior for grazing conditions is shown as the solid curve "B". The curve touches but does not pass through the boundary $\Sigma$, separating the two regions of the system's behavior. The periodic response represented by the curve "C" demonstrates how the response is affected by constrained conditions for a piecewise linear model with region $f_0$ corresponding to "no contact" and region $f_1$, corresponding to "contact" with the constraining material.

Figure 3A:
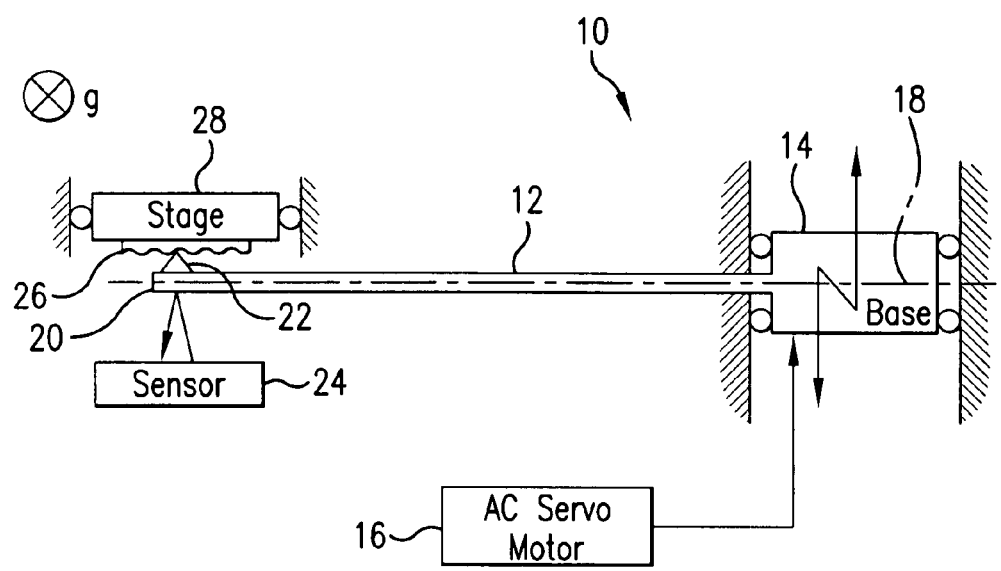
FIG. 3A is a schematic representation of an experimental set-up.
Figure 3B:
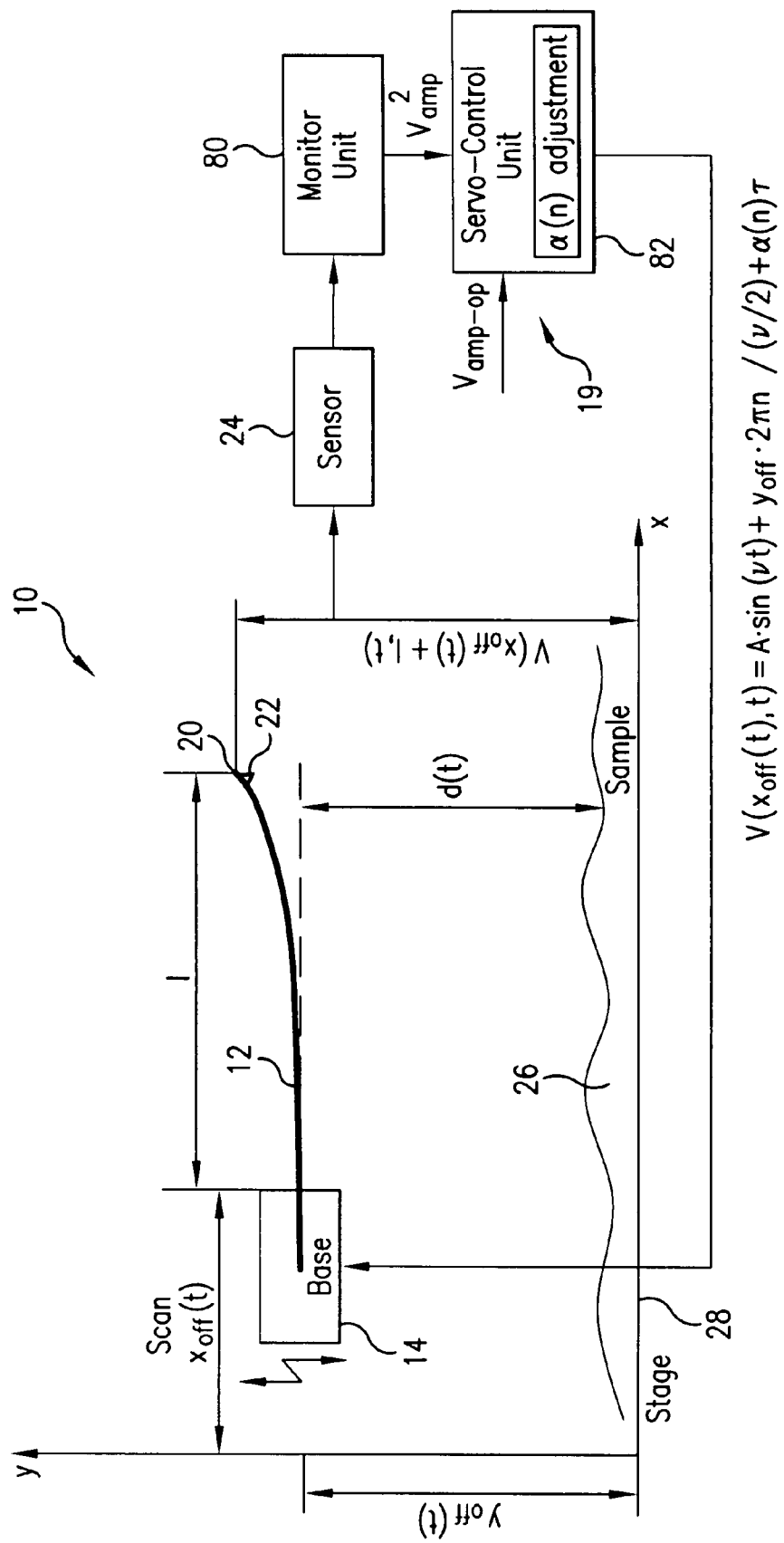
FIG. 3B is a diagram of the model developed to study the behavior of the cantilever probe of the AFM system.

With the aid of a macro-scale test apparatus shown in FIG. 3A, and through the model, shown in FIG. 3B, developed to study the behavior of the sinusoidally excited cantilever beams, a unique nonlinear phenomenon associated with a grazing bifurcation has been studied to result in operational parameters for near-grazing behavior in the AFM system. Experimental observations of the cantilever probe in a commercial AFM system were compared and qualitative agreement with the macro-scale results was found.

Referring to FIGS. 3A-3B, the system 10 being investigated consists of a long, slender phosphor bronze beam 12. The beam is cantilevered from a movable cantilever holder (or supporting base) 14 and oriented in such a fashion as to avoid gravitational effects. This is done to attain the negligible effect of gravity on a micro-scale structure when compared to the other forces acting on the system.

The base 14 is mounted on a ball screw and is actuated by an AC servo motor 16 in order to harmonically excite the cantilever beam at a center of oscillation 18. The servo motor 16 is controlled by a closed-loop control scheme 19 that employs an optical sensor to monitor the position of the base 14. At the free end (tip) 20 of the cantilever, a small bolt is affixed to the beam with a hex nut in order to act as an impactor 22. The response of the beam at the tip 20 is monitored with a laser displacement sensor 24.

This data was used to study the behavior of the system and in the development of the system model. The data was also compared with the simulated response to verify the performance of the numerical simulation. A compliant contact material (sample) 26 made of a very soft foam rubber material is placed onto a high resolution manual stage 28 which is positioned along the beam 12 in line with the impactor 22. This permits for collisions to occur periodically between the impactor 22 and the contact material 26 when the stage 28 is sufficiently close to the beam 12. The parameters of the system shown in FIG. 3A, are listed in Table I.

Important Dimensions of Experimental Test Apparatus.

TABLE I

| Parameter | Value |
| --- | --- |
| Beam Material | Phosphor Bronze |
| Density | 8.8 gram/cm$^3$ |
| Young's Modulus | 117.0 GPa |
| Beam Length | 436.0 mm |
| Beam Width | 20.0 mm |
| Beam Thickness | 0.8 mm |
| Impactor mass | 0.8 gram |

A nonlinear beam model was developed, taking into account a number of potential sources of nonlinearity, in order to explain the behavior of this system. The model is able to accurately simulate the large deflections that may be experienced when the beam is excited near resonance. In order to derive the equation of motion, the beam is assumed to be inextensional. The inextensionality condition provides a relation between the longitudinal displacement of the beam and the transverse displacement of the beam, represented by $\omega(s, t)$ in the model. This displacement is a function of both time t and the position s along the length of the structure.

The first step toward obtaining the equation of motion for the transverse vibrations of the beam is to determine the kinetic and potential energies of the system. The total kinetic energy consists of the kinetic energy of the beam for both longitudinal and transverse motion and the kinetic energy of the impactor for both longitudinal and transverse motion. In order to account for the base excitation, a moving reference frame X(t) is utilized to represent the displacement produced by the linear guide actuator. Due to the slenderness of the beam, the rotary inertia is neglected.

The rotary inertia of the impactor is considered to be negligible, which permits it to be modeled as a point mass. Due to the orientation of the beam, the total potential energy consists of only the potential energy from a bending stiffness term. The total energy equations are combined with a Lagrange multiplier and the inextensionality condition to form the augmented Lagrangian.

The augmented Lagrangian and the non-conservative work are combined and the variation of this sum is integrated with respect to time in order to apply the extended Hamilton's principle. For this system, the non-conservative work is produced by the discontinuous contact force, $F_c(t)$, that results from collisions between the impactor and the surface of the contact material. Through this process, and by neglecting terms of orders higher than cubic, a partial differential equation of motion is obtained for the transverse displacement of the cantilever beam. In this equation, over-dots are used to represent derivatives with respect to time and derivatives with respect to position are represented by the prime symbol.

$$EI\omega^{iv} + EI[\omega'(\omega'\omega'')']' + c_1\dot\omega + \\ c_{n1}\dot\omega|\dot\omega| + \rho A\ddot\omega - \frac{m_{tip}}{2}\omega''\left[\int_0^L \frac{\partial^2}{\partial t^2}(\omega')^2 ds\right] + \\ \frac{\rho A}{2}\left\{\omega'\int_L^s\left[\int_0^s \frac{\partial^2}{\partial t^2}(\omega')^2 ds\right]ds\right\}' = F_b + F_c \quad \text{(Eq. 1)}$$

Eq. (1) includes both linear and nonlinear inertial terms, linear and nonlinear bending stiffness terms, and a nonlinear inertial term corresponding to the impactor. Linear and nonlinear damping terms are also added to account for energy dissipation. The form of these terms will be discussed in further paragraphs when the values of the damping coefficients are determined. The Eq. 1 also includes the forces $F_b$ and $F_c$ acting on the beam as a result of the base excitation and collisions with the contact material, respectively.

The force acting on the beam due to the base excitation is calculated as the product of the mass per lengthy of the beam and the acceleration applied to the structure. In the case of harmonic excitation, the force is defined by Eq. (2) where $X_0$ is the displacement amplitude of the excitation and $\omega$ is the excitation frequency.

$$F_b = -\rho A\ddot X(t) = \rho A\omega^2 X_0 \cos(\omega t) \quad \text{(Eq. 2)}$$

Since the contact material is compliant in nature, the discontinuous force resulting from contact between the material and the impactor is represented with a piece-wise linear model. The contact force, defined by Eq. (3a), consists of a restoring force acting on the beam when the displacement of the beam tip is greater than the separation distance b between the contact material surface and the center of oscillation of the beam.

The restoring force, defined by Eq. (3b), is a linear function of the stiffness and damping coefficients of the contact material and the displacement and velocity of the impactor at the free end of the beam. An additional requirement for the model is that the value of the restoring force must be positive, since a negative value would indicate that the impactor has separated from the contact material. This occurs when the impactor is moving away from the contact material at a greater rate than the material is able to return to its uncompressed position.

$$F_C = \begin{cases} F_r\omega(L,t)\rangle b \text{ and } F_r\rangle 0 \\ 0 \text{ otherwise} \end{cases} \quad \text{(Eq. 3a)}$$

$$F_r = k_c[\omega(L,t) - b] + c_c\dot\omega(L,t) \quad \text{(Eq. 3b)}$$

The boundary conditions, shown as Eq. (4a) and Eq. (4b) for s=0 and as Eq. (4c) and Eq. (4d) for s=L, are also obtained from the extended Hamilton's principle. The boundary conditions are those of a uniform cantilever beam with the exception that the shear force at the free end of the beam balances the inertial force of the impactor.

$$\omega(s,t)|_{s=0} = 0 \quad \text{(Eq. 4a)}$$

$$\omega'(s,t)|_{s=0} = 0 \quad \text{(Eq. 4b)}$$

$$EI\omega''(s,t)|_{s=L} = 0 \quad \text{(Eq. 4c)}$$

$$EI\omega'''(s,t)|_{s=L} = m_{tip}\ddot{\omega}(s,t)|_{s=L} \quad \text{(Eq. 4d)}$$

With these boundary conditions and the partial differential equation of motion, a complete model has been developed for the system shown in FIG. 3A and numerical methods are utilized in order to study its dynamic behavior.

Numerical Simulations

A reduced-order-model has been developed from the non-linear beam model derived in the previous paragraphs in order to obtain a model of the system. The discrete model was then used to conduct numerical experiments in order to study the dynamic behavior of the system.

1. Model Discretization

Through this process, the response of the cantilever beam is approximated by the summation of a finite number of model responses. By using separation of variables, the transverse displacement of the beam, $\omega(s,t)$, is separated into a finite number of position dependent mode shapes, $\phi_n(s)$, and time dependent model responses, $q_n(t)$.

The forms of the mode shapes are calculated from a linearized, conservative form of Eq. (1) which is obtained by removing the nonlinear terms, the damping terms, and the excitation terms. By approximating the behavior of the system with these linear mode shapes, the Galerkin method is applied to the nonlinear beam model. Through this process, a number of N×N model parameter matrices and N×1 model force vectors are produced where N is the number of mode shapes used to discretize the system.

This discretization produces the equation of motion that is used to simulate the dynamic behavior of the system. This equation is shown as Eq. (5).

$$[M]\{\ddot{q}\} + [K]\{q\} + [C_L]\{\dot{q}\} + [C_{NL}]$$
$$\{\dot{q}|\dot{q}|\} + [\alpha_1]\{q^3\} + [\alpha_2]\{\dot{q}^2 q + q^2 \ddot{q}\} = \{F_B\} + \{F_C\} \quad \text{(Eq. 5)}$$

The mode shapes are normalized causing the mass matrix [M], to be equal to the identity matrix and the stiffness matrix, [K], to be a diagonal matrix where the components are equal to the system's characteristic frequencies squared. Non-zero off-diagonal components in the model parameter matrices for the nonlinear stiffness, $[\alpha_1]$, and for the nonlinear inertia, $[\alpha_2]$, reveal nonlinear coupling between the different vibration modes. The linear and nonlinear damping matrices, $[C_L]$ and $[C_{NL}]$, are approximated by using linear and nonlinear damping factors.

Figure 4A:
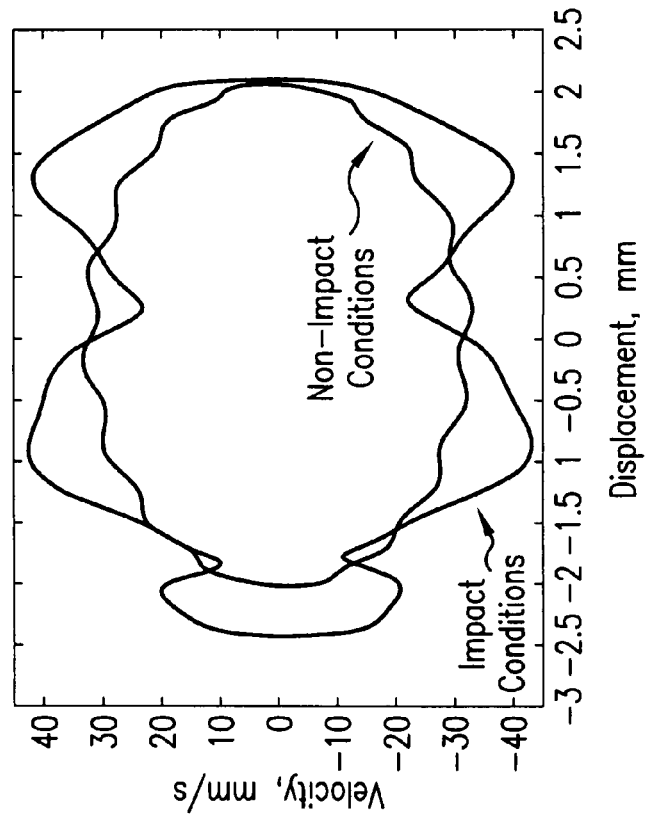
FIGS. 4A-4B are phase diagrams of the probe's response to harmonic excitation near the fundamental frequency obtained experimentally (FIG. 4A) and by simulation (FIG. 4B)

The two sources of external force acting on the system of FIG. 4A are the base excitation and the collisions between the impactor and the contact material surface. The model forces due to base excitation, $\{F_B\}$, were calculated from the beam properties and excitation conditions. To calculate the values of the model forces resulting from periodic impacts, the model responses were combined to determine the system response and the corresponding force acting on the system. Additional calculations were then performed to separate this force into the model components, $\{F_C\}$, for use within the numerical simulations.

The N×1 column vector $\{q\}$ contains the model response coordinates for the first N vibration modes of the system. The components of this vector were operated on as indicated in Eq. (5) to produce the necessary time derivatives and nonlinear terms.

2. Damping and Contact Material

While the values of the components in the model mass and model stiffness matrices are calculated from the geometry of the beam and known material properties, the damping within the system is not quantified quite as easily. To determine the form of the damping and the corresponding coefficient values, an identification process using experimental data is employed. The coefficient values for the stiffness and damping associated with the contact material are also determined with the aid of experimental methods.

In order to accurately model the dissipation of energy by the cantilever beam for the range of motion to be studied, both viscous damping and aerodynamic damping terms are included in the equation of motion. Free-vibration displacement data is collected and the local minima and maxima of the decaying sinusoid are identified and compared with equivalent data produced by numerical simulation. Since the linear and nonlinear damping factors affect the decay of the free vibrating system differently, a unique solution is obtained.

The two parameter values are tuned in order to minimize the error between the experimental data and the simulated response. The identified parameter values are presented in Table II.

Linear and Nonlinear Damping Factors.

TABLE II

| Parameter | Value |
| --- | --- |
| Linear Damping Factor, $\zeta_L$ | $4.0 \times 10^{-4}$ |
| Nonlinear Damping Factor, $\zeta_{NL}$ | $1.3\ m^{-1}$ |
| Stiffness Coefficient, $k_c$ | $85.68\ N/m$ |
| Damping Coefficient, $c_c$ | $1.7\ Ns/m$ |

As indicated by Eq. (3b), both the stiffness and damping of the contact material are modeled with linear relationships. This assumption is made since the focus of the study is on the transition between unconstrained and constrained behavior, limiting the amount of compression experienced by the contact material. The stiffness of the contact material is calculated with the aid of the high resolution manual stage and a force transducer. The restoring force of the contact material is measured under static conditions for a number of different compression distances. This data is then plotted and fit with a linear trend-line to obtain the linear stiffness coefficient in the form of a slope. The value of the stiffness coefficient for the contact material is listed in Table II.

3. Number of Mode Shapes

In order to obtain a value for the last unknown parameter, the damping coefficient of the contact material, simulated responses is again compared with experimental data but under conditions where the system is excited and periodic collisions occur between the impactor and the surface of the contact material. The value of the damping coefficient is tuned in order to match the response predicted by the simulation with experimental data for the same excitation and constraint conditions. The damping coefficient identified through this comparison is presented in the final row of Table II.

In order to accurately model the dynamic behavior of the system, simulations are performed and compared with experimental observations in order to determine the minimum number of mode shapes required. Within the investigation, harmonic excitation with frequencies between the system's fundamental frequency and second characteristic frequency are used. It has been determined that a multi-mode approximation is necessary to model the vibrations of the beam, even in the case of unconstrained motion when the system is excited near the fundamental frequency.

Figure 4B:
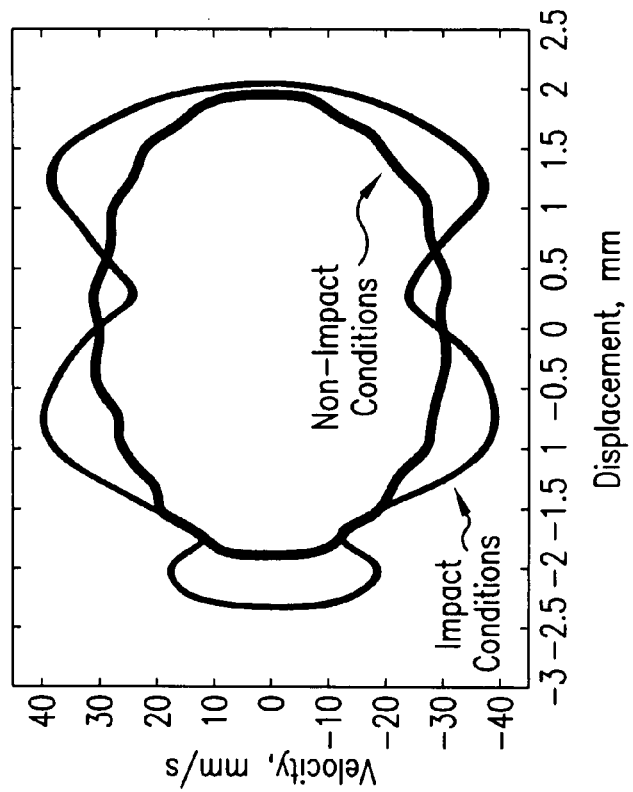

Under these conditions, quasi-periodic behavior is observed and realized within the model by nonlinear coupling between the system's modes of vibration. The simulated behavior is seen to agree with the experimental observations, as shown in FIGS. 4A-4B, where the data is presented in the form of phase portraits to show the response in greater detail. This provides for a more complete comparison between the experimental (FIG. 4A) and simulated (FIG. 4B) responses.

The velocity values for the experimental data are calculated from the measured displacement values. The multi-mode approximation is found to be even more important when the system experiences periodic collisions between the impactor and the surface of the contact material. When the separation distance is decreased below a critical value, the contact material constrains the motion of the oscillating beam, partially forcing the first mode of vibration into the profile of the second vibration mode. Phase portrait plots of experimental and simulated responses for constrained conditions are also shown in FIGS. 4A-4B.

Figure 5B:
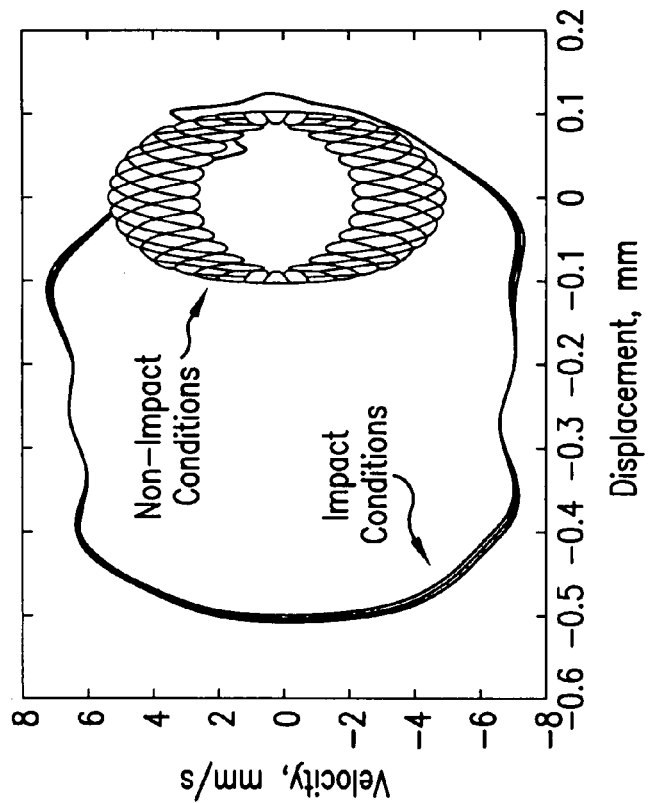
FIGS. 5A-5B are phase diagrams of the probe's response to harmonic excitation near 2.5 times the fundamental frequency obtained experimentally (FIG. 5A) and by simulation (FIG. 5B)
Figure 5A:
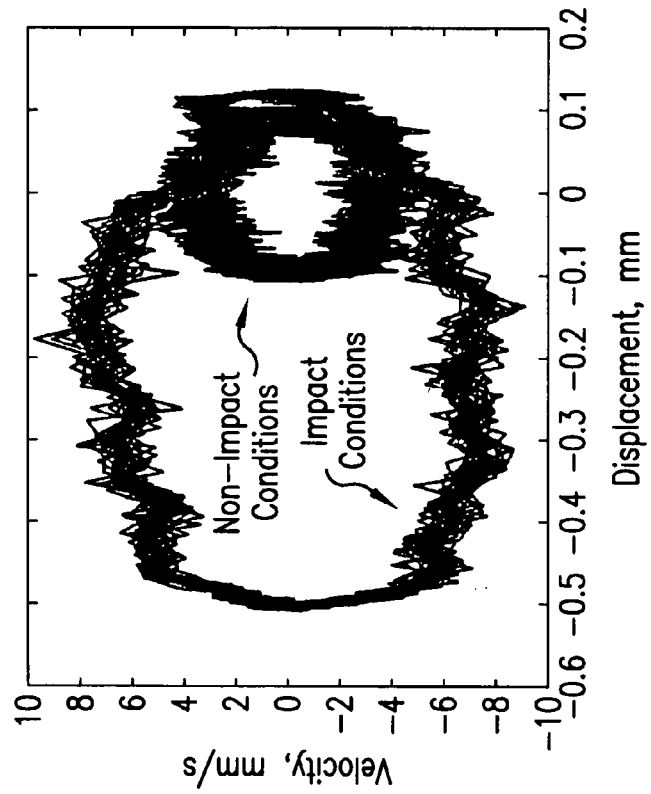

A multi-mode approximation is also required when the system is excited at frequencies between the system's first and second characteristic frequencies. For an unconstrained condition, the system's response is observed to be oscillations at the excitation frequency with a considerable amount of amplitude modulation. As in the previous case, this quasi-periodic behavior is realized within the model by the nonlinear coupling. The use of the multi-mode approximation enables the simulation to predict the amplitude modulation, but more importantly it enables the model to provide an accurate simulation of the system's response for constrained conditions. The response to harmonic excitation with a frequency between the first and second characteristic frequencies for unconstrained and constrained conditions are shown in FIGS. 5A-5B. Due to the off-response condition, the amplitude of the response is small enough that experimental measurements are affected by noise. The effect of this noise is further amplified when the velocity of the free end of the beam is calculated as the derivative of the displacement. Despite the effects of noise, qualitative agreement is seen between the experimental response and the response predicted by the simulation.

Within the study, the first three modes of vibration are used to approximate the response of the system for a number of excitation frequencies between the system's first and second characteristic (natural, a.k.a. fundamental) frequencies and for various unconstrained and constrained conditions. The quasi-periodic response was found to be due to a coupling between the first and third modes of vibration. The contribution of the third vibration mode is seen to decrease for constrained conditions while the contribution of the second vibration mode increases.

Micro-Scale System

After studying the macro-scale test apparatus shown in FIG. 3A, both experimentally and with the aid of the numerical simulations, additional experiments have been conducted with a commercial Atomic Force Microscope in order to study the scalability of the nonlinear phenomenon and to determine how well the macro-scale system represented the AFM cantilever probe. The main components of the AFM system are shown in the diagram in FIG. 6.

Figure 6:
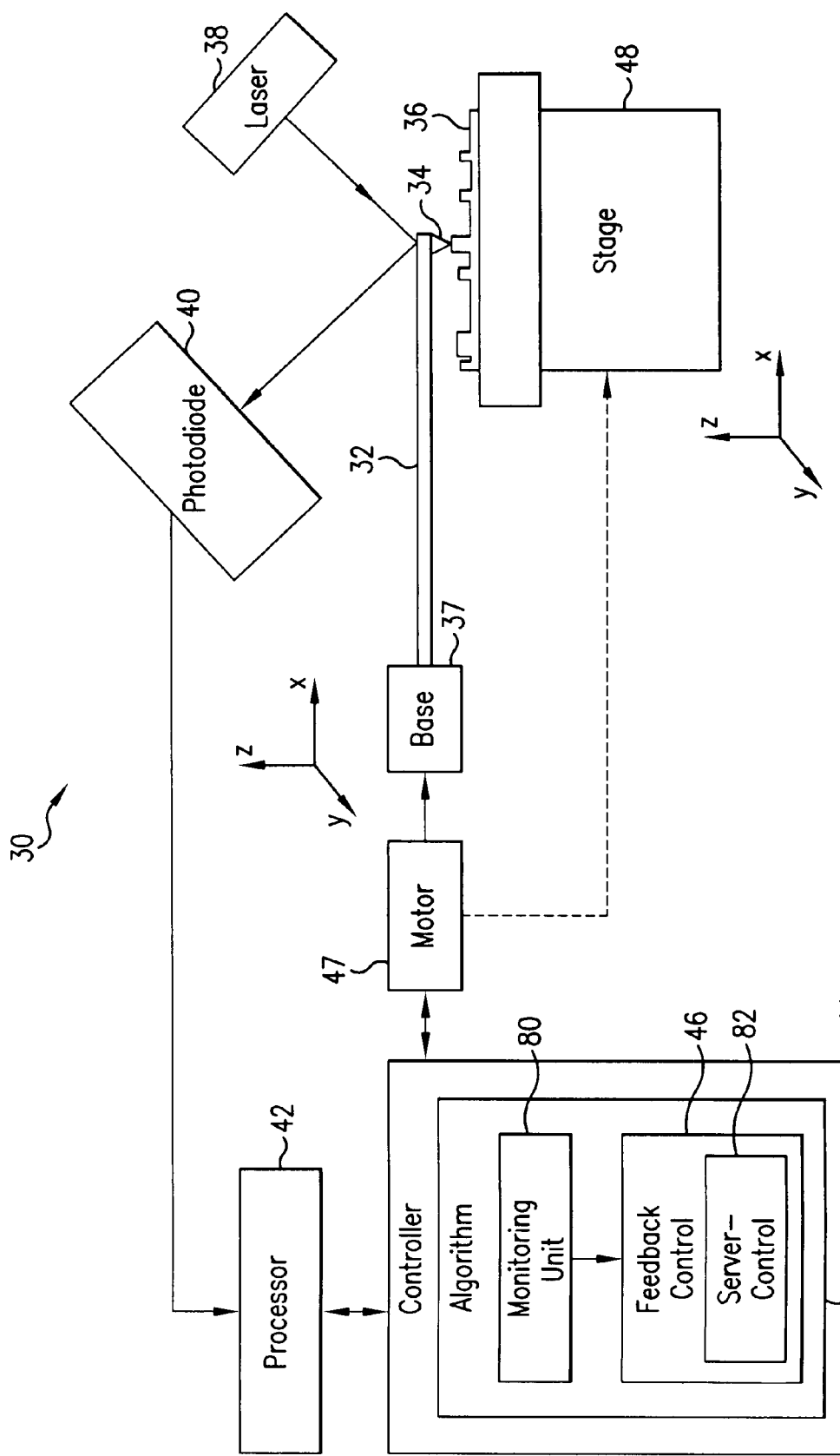
FIG. 6 is a schematic representation of the Atomic Force Microscope system of the present invention.

Referring to FIG. 6, the Atomic Force Microscope system 30 includes a microscale cantilever 32 with a sharp probe 34 at its end which is used to scan the surface of a sample 36. The cantilever is supported by a base (cantilever holder) 37 at another end thereof. When the probe is brought into proximity to a sample surface, the forces between the tip and the sample lead to a deflection of the cantilever. The deflection of the cantilever is measured in an optical arrangement including a laser 38 and an array of photodiodes 40.

The reflection of a laser spot from the top of the cantilever is detected by the photodiodes and is processed in a processing unit 42 to calculate the cantilever deflection. During the scanning of the probe with regard to the sample surface, a controller 44 is employed which includes a feedback mechanism 46 for controlling an AC servo motor 47 to adjust the tip-to-sample distance to maintain a near-grazing behavior of the AFM system to avoid the risk of damaging the sample surface if the probe collides with the sample surface either by moving the base 37 or a sample stage 48, on which sample 36 is mounted.

The piezoelectric stage 48 that can move in the z direction for maintaining a constant impact force, and in x and y directions for scanning the probe with regard to the sample surface. The controller 44 calculates adjustment parameters to control the tip-to-sample distance based on photodiodes readings and drives the piezoelectric stage 48 or the base 37 accordingly, by means of the servo-motor 47, as will be presented in further paragraphs in conjunction with FIGS. 3B, 6, and 18-20.

The cantilever probe 34 of the AFM system 30 may be fabricated from a single crystal silicon and has the same general shape as the macro-scale cantilever of FIG. 3A with its length, width, and thickness equal, for example, to 450 µm, 40 µm, and 5 µm, respectively. These properties result in a fundamental frequency of 28 kHz. In comparing the relationships between these dimensions with those of the macro-scale test apparatus, the micro-scale cantilever is much less slender with length-to-width and width-to-thickness ratios around 10:1 while these ratios for the macro-scale cantilever are greater than 20:1. This is believed to be a contributing factor in the higher level of nonlinear behavior observed of the macro-scale test apparatus.

As was discussed in previous paragraphs, the operation mode of interest is the tapping mode (or Intermittent Contact mode) whereby the AFM probe oscillates above the sample, coming in contact with the surface once per oscillation period. In order to observe the behavior of the cantilever probe in the commercial system, the output voltage of the photodiode array is monitored. This data is used to study the qualitative behavior of the cantilever probe's response while it is subjected to different excitation and constraint conditions. As the commercial AFM system is designed for operation near resonance conditions, the range of excitation is limited and the magnitude of the response for off-resonance conditions is significantly smaller.

With the simulation developed for the cantilever beam impactor system and verified through comparison with experimental data, studies have been conducted to investigate the system's response for unconstrained conditions and various constrained conditions. The responses of the system under these conditions were studied in order to determine a way in which to locate the critical separation distance corresponding to grazing. The two parameters that were varied within these studies were the excitation frequency and the separation distance.

After preliminary studies were conducted, two excitation frequencies were selected for a more thorough investigation. The two frequencies examined were 2.50 Hz and 6.25 Hz. The first excitation frequency is very close to the system's fundamental (first natural) frequency, which is 2.42 Hz and corresponds to the standard excitation condition for tapping-mode Atomic Force Microscopy. The second excitation frequency has a value of about 2.5 times the fundamental frequency but less than the second characteristic frequency, which is 15.16 Hz.

Figure 7A:
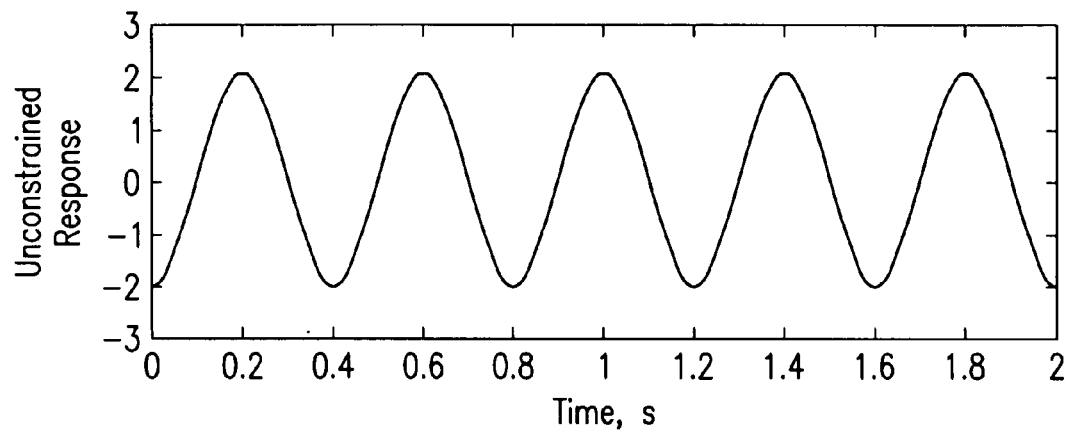
FIGS. 7A-7B are diagrams representative of the probe's response for excitation near the fundamental frequency for unconstrained conditions (FIG. 7A) and constrained conditions (FIG. 7B)
Figure 7B:
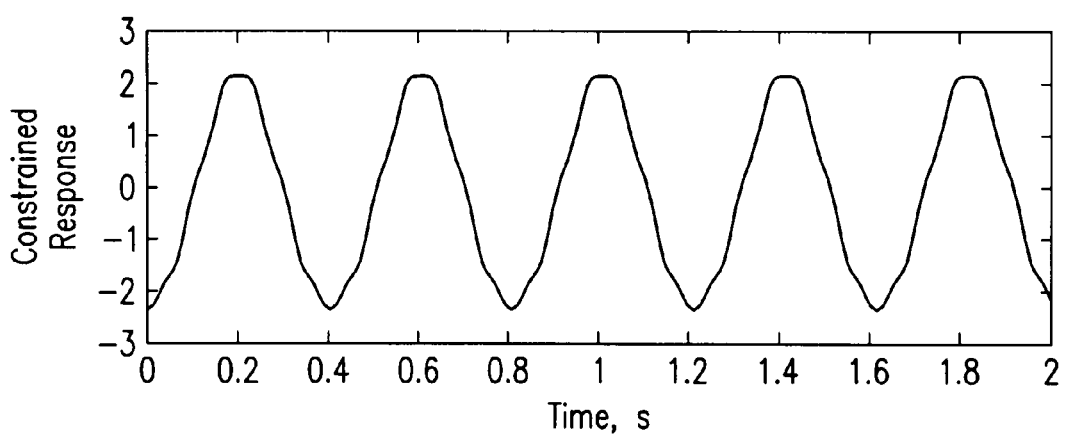

Excitation Near First Natural (Fundamental) Frequency $\omega_1$,

The first excitation frequency that was investigated, 2.50 Hz, was very close to the fundamental frequency (first natural frequency) of the system. At these conditions, the response amplitude benefits from the resonance condition. When comparing the system's response for unconstrained and constrained conditions, a visual examination of the phase portraits in FIGS. 4A-4B reveals significant differences. However, in order to develop a method to locate the critical separation distance that corresponds to grazing, it is desirable to quantify the changes in the system's response in a manner that can be calculated in real-time from the displacement time series of the system. Time series plots of the system's responses for this excitation condition are shown in FIGS. 7A-7B. This comparison shows no noticeable change in the response frequency and very little change in the amplitude of the response. A comparison of the two time series plots reveals that the response under constrained conditions experiences a greater deviation from harmonic behavior than under unconstrained conditions.

Figure 8A:
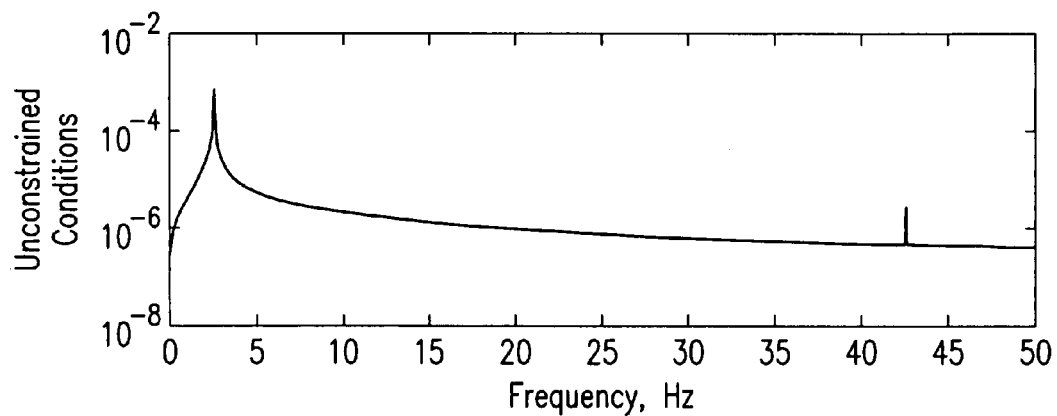
FIGS. 8A-8B are diagrams representative of the probe's frequency spectrum responsive to excitation near the fundamental frequency for unconstrained conditions (FIG. 8A) and for constrained conditions (FIG. 8B)
Figure 8B:
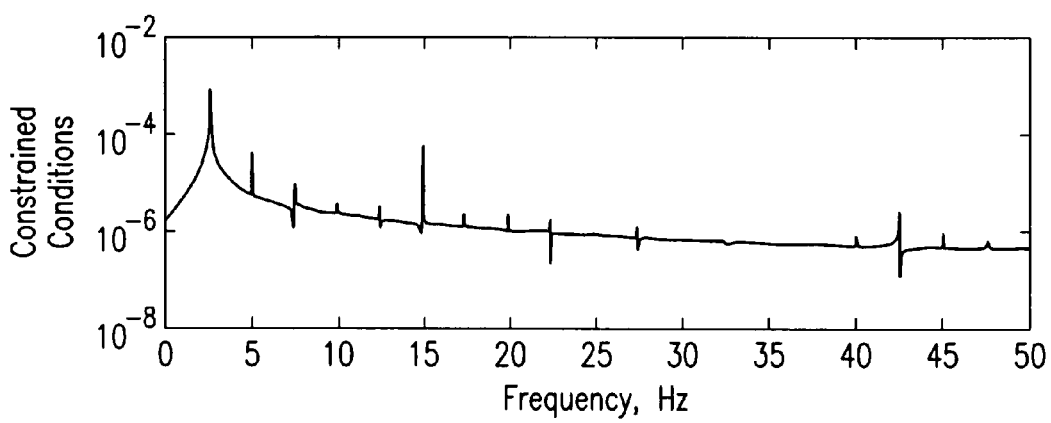
Figure 9A:
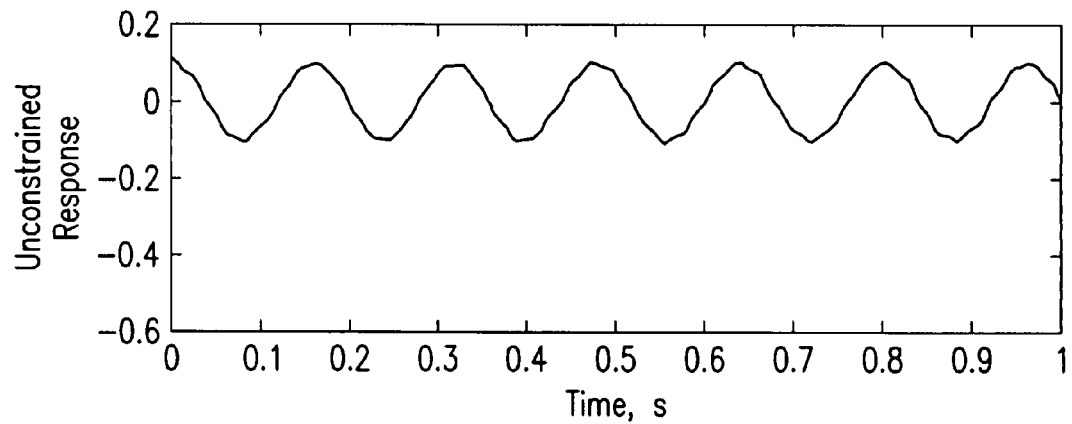
FIGS. 9A-9B are diagrams representative of the probe's response for excitation near 2.5 times the fundamental frequency for unconstrained (FIG. 9A) and constrained (FIG. 9B) conditions.
Figure 9B:
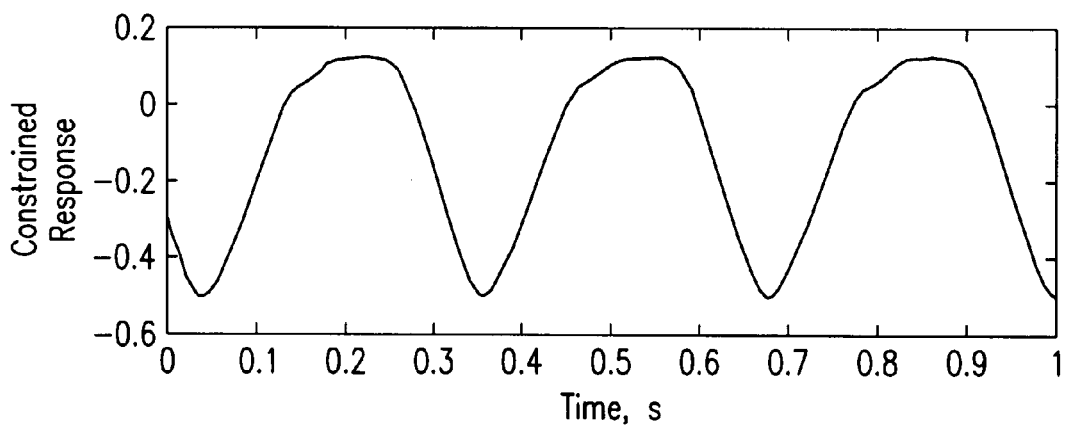

In order to further examine how the system's response changes with the addition of periodic impacts, spectral information for the response signals was calculated with a Fast Fourier Transform and examined. The frequency spectrum plots the system's response for unconstrained conditions and for constrained conditions as shown in FIGS. 8A and 8B, respectively. These figures indicate that the main component of the response, at the excitation frequency, does not change. This confirms the observations made from the time series plots. These plots also reveal a number of other frequency components. For the unconstrained response, FIG. 8A reveals a second significant frequency component at 42.49 Hz, the system's third characteristic frequency.

This component accounts for the quasi-periodic behavior observed in the phase portraits. For the response of the beam impactor system under constrained conditions, there are many more frequency components in the spectral plot of the system's response. The largest of the new components appears at the system's second characteristic frequency and is produced by the collisions in the manner discussed previously. A number of other frequency components in the responses occur at integer multiples of the excitation frequency, however, the magnitude of these components are significantly less than the components discussed.

Although it is clear that the system's response changes when the separation distance is sufficiently decreased to produce constrained conditions, the changes are relatively small and they are generally quantitative with respect to the different vibration modes. For very soft contact material used in this study, these changes were found to be negligible.

Excitation Near $2.5 \times \omega_1$

During the preliminary investigation at the response of the experimental system shown in FIG. 3A under constrained conditions, a unique nonlinear phenomenon was observed for an excitation frequency value of 6.25 Hz. When excited with this frequency, which is about 2.5 times the system's fundamental frequency, the response of the system undergoes a significant qualitative change for constrained conditions. The response of the system changes from quasi-periodic behavior to a response with a period twice as long as the period of the excitation.

Period-two responses have been observed in other similar experimental systems for excitation frequency values around this multiple of their fundamental frequencies as well as for higher excitation frequencies. The responses at this excitation frequency for unconstrained and constrained conditions are plotted in FIGS. 11A and 11B, respectively. For the system examined, the amplitude of this period-two response increases significantly from the amplitude of the unconstrained response. This drastic qualitative change in the system's behavior at the critical separation distance appears to provide a means to locate grazing.

Figure 10A:
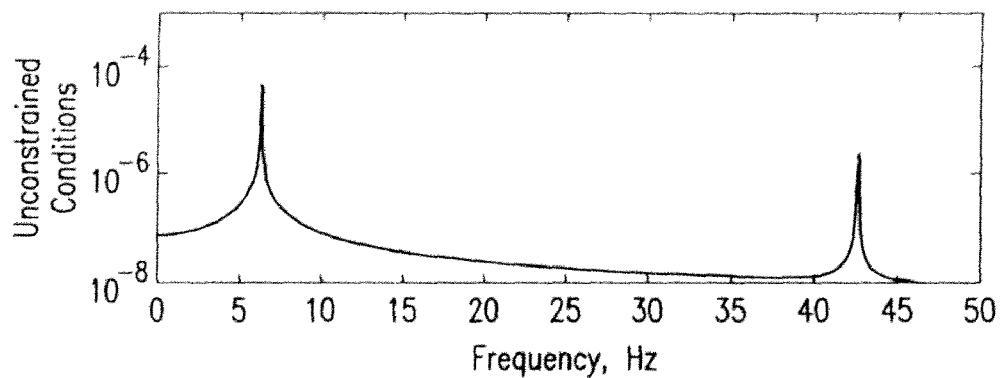
FIGS. 10A-10B are frequency spectrum plots of the system response for excitation near 2.5 times the fundamental frequency for unconstrained (FIG. 10A) and constrained (FIG. 10B) conditions.

In the same manner as for the previous excitation frequency, spectral information was calculated for the system's responses for both unconstrained (FIG. 10A) and constrained (FIG. 10B) conditions. The frequency spectrum plot in FIG. 10A reveals that the quasi-periodic behavior is also caused by the system's third mode of vibration. The frequency spectrum plot of the response for constrained conditions (FIG. 10B) reveals many more frequency components for this excitation frequency.

While the magnitudes of most of these components are very small, a new component (characteristic frequency component) 50 is produced at half the excitation frequency. This sub-harmonic of the excitation frequency accounts for the period-two behavior observed in the time series plots. Unlike the frequency components produced during constrained conditions for the previous excitation frequency, this component 50 has a magnitude on the same order as the component at the excitation frequency and is easily identified, even in the presence of noise.

For an excitation frequency with a value of about 2.5 times the fundamental frequency, a significant qualitative change occurs in the response when the separation distance is sufficiently decreased to produce constrained conditions. Even for the extremely soft material used in this study, the change in the response is drastic and easily quantified.

With the aid of numerical simulation, Floquet theory is employed to study the stability of the periodic behavior of the macro-scale test apparatus. The results of this analysis indicates that the unconstrained periodic responses of the system for both excitation frequencies are stable, with all Floquet multipliers having magnitudes less than one. For the constrained conditions, the periodic responses for excitation frequencies of both 2.50 Hz and 6.25 Hz were both found to be stable. Under these constrained conditions, the additional damping from the constraining material acts to further improve the stability of the response. This was observed as a decrease in the magnitudes of the Floquet multipliers.

Grazing Bifurcation

In order to further study the changes to the system's response that occur when the separation distance is decreased sufficiently to produce constrained conditions, Poincaré sections were calculated from the system's responses and assembled to produce bifurcation diagrams. This was done for the response of the system when it was excited harmonically at 2.50 Hz and 6.25 Hz by using the separation distance as the control parameter.

Figure 11:
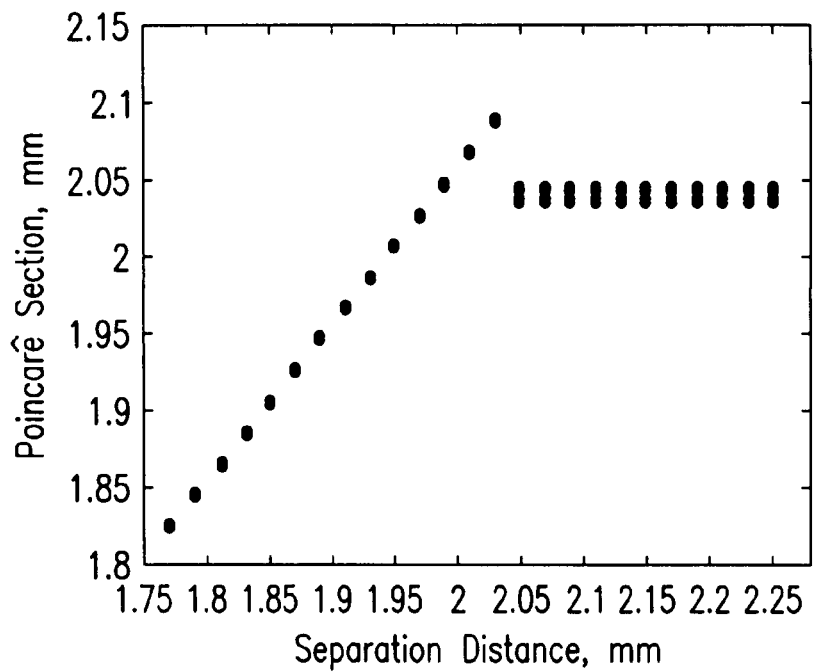
FIG. 11 is a bifurcation diagram for harmonic excitation near the fundamental frequency with the separation distance as control parameter.

When the beam impactor system is excited harmonically at a frequency near the fundamental frequency, the resulting bifurcation diagram shown in FIG. 11, reveals a change in the response amplitude. Additionally, it is noted that the Poincaré sections for the unconstrained responses are identical, as there is no change to the system until the separation distance is decreased below the critical distance. The data points within these Poincaré sections are distributed across a small range of amplitude values due to the quasi-periodic nature of the responses.

Figure 12:
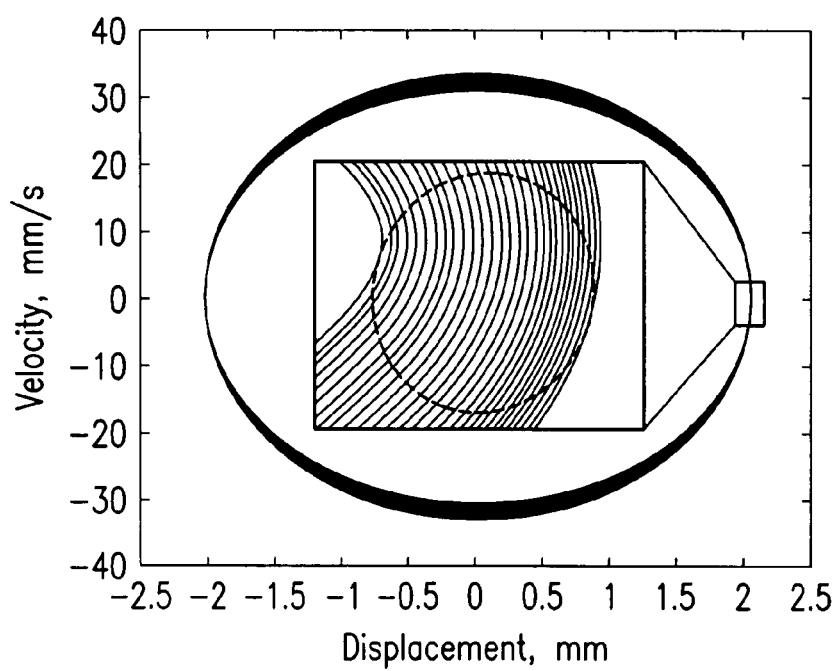
FIG. 12 is a phase diagram of the system's unconstrained response to harmonic excitation near the fundamental frequency.

This quasi-periodicity is shown in FIG. 12 where the Poincaré sections are shown to produce a closed curve in phase space. This unique bifurcation, where a quasi-periodic response becomes periodic is observed as a result of the use of a control parameter that corresponds to the structure of the system.

Figure 13:
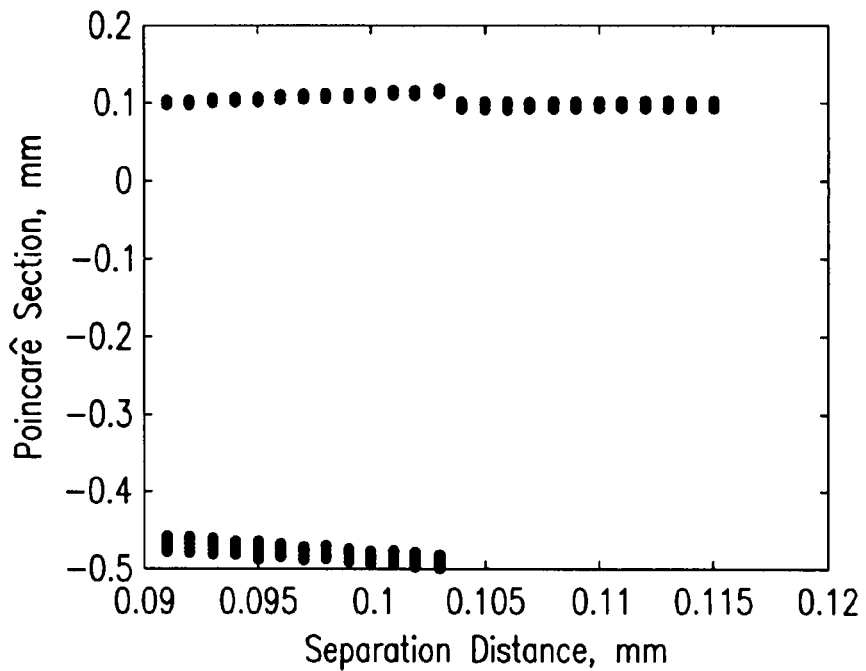
FIG. 13 is a bifurcation diagram for harmonic excitation near 2.5 times the fundamental frequency with the separation distance as control parameter.
Figure 14:
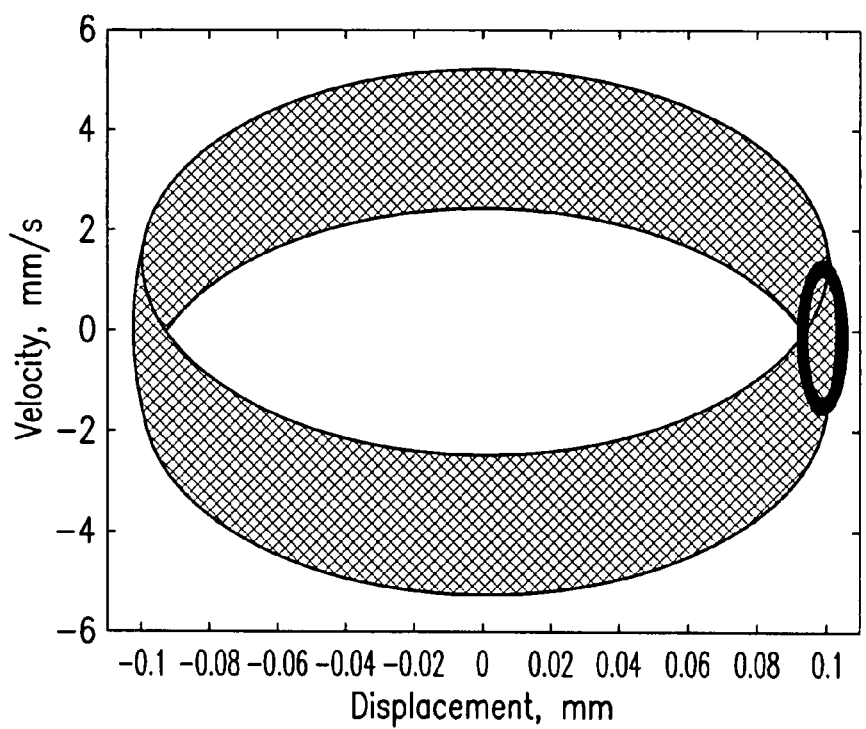
FIG. 14 is a phase diagram of the system's unconstrained response to harmonic excitation near 2.5 times the fundamental frequency.

For the other excitation case that has been examined, more complex behavior is revealed by the bifurcation diagram, shown as FIG. 13. When the system was excited near 2.5 times the fundamental frequency, the quasi-periodic unconstrained response changed into a periodic response with a period twice as long as the period of the excitation. As with the previous bifurcation diagram, the Poincaré sections, corresponding to the unconstrained response of the system, are spread across a range of amplitude values due to its quasi-periodic nature. The quasi-periodicity of the response is shown in FIG. 14 with a Poincaré section plotted within a phase portrait.

Micro-Scale System

After working with the macro-scale test apparatus to study this nonlinear phenomenon, experiments were conducted with a commercial AFM system. This was done to verify that the nonlinear behavior observed within the macro-scale system was representative of the micro-scale structure. The behavior of the system was studied for two excitation frequencies, the first near the fundamental frequency and the second at a value of about 2.5 times the fundamental frequency.

In comparing the experimental data from the micro-scale system with the behavior studied in the macro-scale test apparatus, there are some discrepancies. These may be caused by the differences between the macro-scale test apparatus and the micro-scale structure. Due to these differences, the behavior of the AFM probe does not exhibit quasi-periodic behavior. In addition, the response of the system to an excitation frequency of 2.5 times the fundamental frequency has a much smoother transition from non-contact to contact behavior.

Figure 15B:
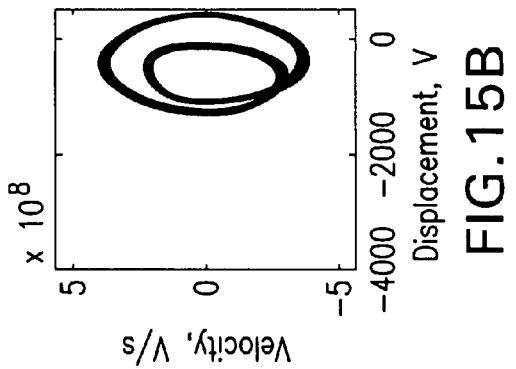
FIGS. 15A-15D are phase diagrams of velocity data collected from commercial AFM system for an excitation frequency of 2.5 times the fundamental frequency for unconstrained conditions (FIG. 15A) and constrained conditions (FIGS. 15B-15D) as separation distance is incrementally decreased.
Figure 15D:
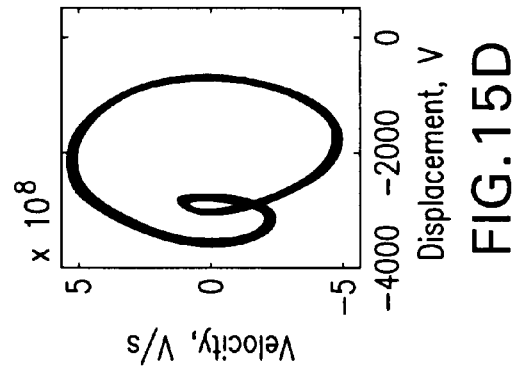
Figure 15A:
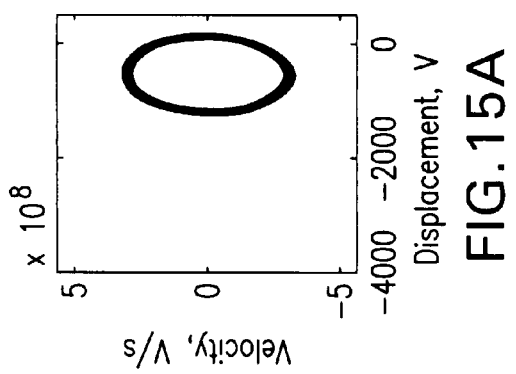
Figure 15C:
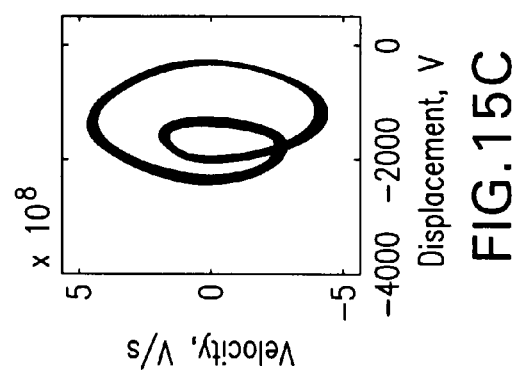

The phase portraits in FIGS. 15A-15D represent this transition. The AFM probe oscillates harmonically when the separation distance is greater than the critical value, as shown in FIG. 15A. The manner in which the AFM probe's response changes as the separation distance is decreased beyond the critical value is presented in FIGS. 15B-15D.

Figure 16A:
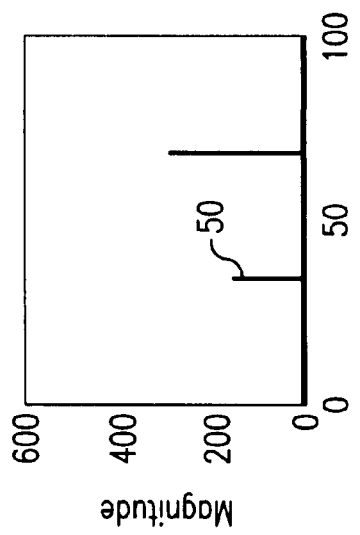
FIG. 16A-16D are frequency spectrum plots of magnitude data collected from commercial AFM for an excitation frequency of 2.5 times the fundamental frequency for unconstrained conditions (FIG. 16A) and constrained conditions (FIGS. 16B-16D) as the separation's distance is incrementally decreased.

To gain a better understanding of how the response of the AFM probe changes as the separation distance is incrementally decreased beyond the critical value, the data plotted in FIGS. 15A-15D were analyzed with a Fast Fourier Transform in order to examine the frequency components. This spectral information obtained was plotted in FIGS. 16A-16D. The spectral information for unconstrained conditions, shown in FIG. 16A, reveals a single significant frequency component at the excitation frequency. The spectral information plot for the system's response under constrained conditions in FIGS. 16B-16B contains a characteristic significant frequency component 50, located at half of the excitation frequency. The frequency spectrum plots in FIGS. 16C and 16D indicate that as the center of oscillation of the probe is moved closer to the surface of the sample, the strength of the sub-harmonic characteristic component 50 of the excitation frequency will increase.

Figure 17:
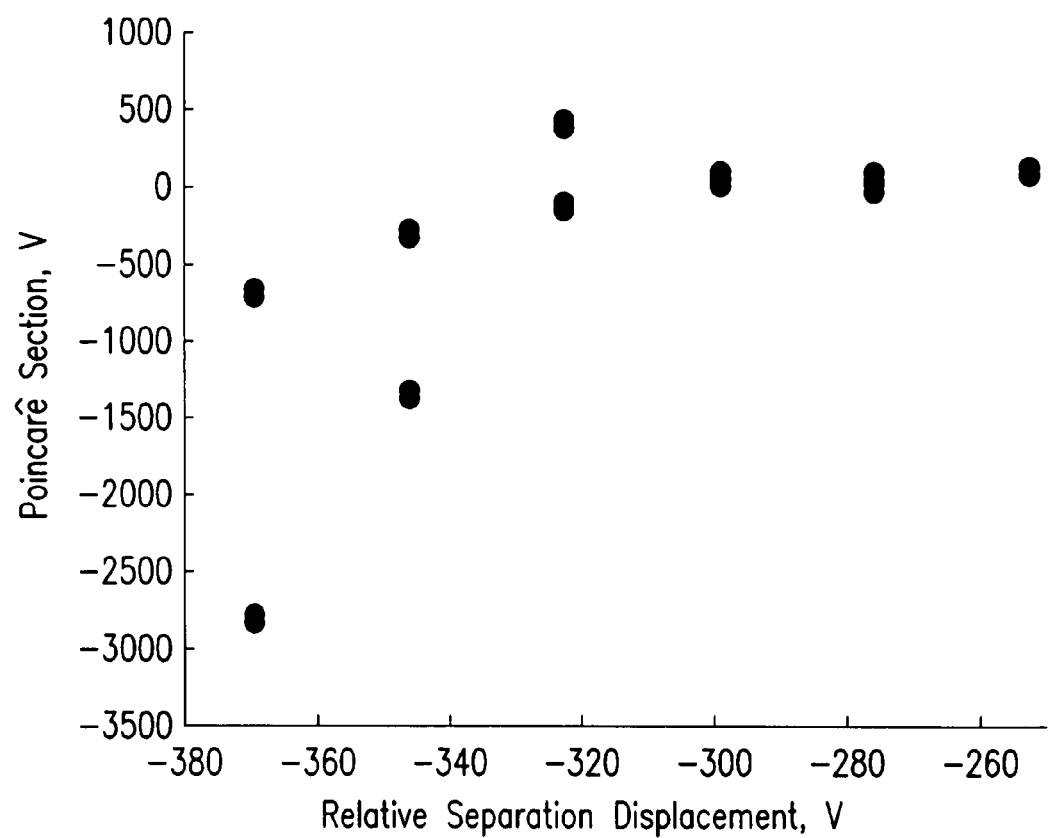
FIG. 17 is a bifurcation diagram of the data collected from the commercial AFM system for an excitation frequency of 2.5 times the fundamental frequency.

The changes in the response observed of the AFM probe are even more desirable than those observed in the macro-scale experiment. For the macro-scale system, the transition is very drastic but a smoother transition across the grazing point is observed for the AFM probe. A bifurcation diagram illustrating this transition is presented in FIG. 17. The relationship between the separation distance and the magnitude of the sub-harmonic frequency component in the constrained state provides a means to locate grazing. By monitoring the magnitude of the sub-harmonic characteristic component, the separation distance may be tuned, as shown in FIGS. 3B, 6, and 19-20, in order to operate the AFM system at the critical separation distance, as will be presented in further paragraphs. Additionally, the response transition for the AFM probe reveals that when the separation distance is only a small amount less than the critical value, the sub-harmonic frequency component is present but small in magnitude, thus not causing the large increase in force associated with the response transition of the macro-scale system.

The qualitative differences in the transition between unconstrained and constrained motion for the two systems are believed to be due to differences between the ratios of the beam's stiffness to the constraining material's stiffness. In the case of the macro-scale experiment, an extremely soft foam rubber material was used to provide an extreme case and to ensure that the system was successfully representing conditions that would be comparable to an AFM system imaging a delicate sample such as a living biological specimen.

The 'soft' silicone material available for the micro-scale experiments was relatively stiffer. While this suggests that the exact behavior observed of the micro-scale structure may not be identical to the form of the response when imaging a much softer sample, it provides a starting point to develop a new control method for AFM that will utilize this nonlinear phenomenon to minimize the magnitude of the contact force acting on the sample, thus improving the capabilities of Atomic Force Microscopy.

The choice of about 2.5 times the probe's first natural frequency in the experimentations is based on grazing events in one excitation frequency window, and there also exist frequencies in other excitation frequency windows that may be used in the present method.

Referring again to FIG. 3B, representing a diagram of the model developed to study the behavior of the cantilever probe of the Atomic Force Microscope, the probe 22 scans across the surface of the sample 26 in the x direction where $x_{off}(t)$ is the scanning position and $V(x_{off}(t),t)$ is the position of the base (cantilever holder) 14, also referred to herein as supporting point, of the cantilever 12 relative to the surface of the stage 28 on which the sample is positioned. The displacement at the tip 20 of the cantilever probe 22 from the surface of the sample stage 28 is given as $V(x_{off}(t)+l,t)$ and is monitored by the laser displacement sensor 24 within the Atomic Force Microscope system.

To implement a nonlinear dynamics based operation method, the excitation frequency v is set equal to 2.5 times the first natural (fundamental) frequency $\omega_1$ of the cantilever structure. Due to the occurrence of a period doubling phenomenon, detailed in previous paragraphs, when the sample surface is sufficiently close to the tip of the oscillating cantilever, a new significant frequency component of the system's response, which is the characteristic frequency component, is produced at approximately half of the excitation frequency v/2.

Figure 10B:
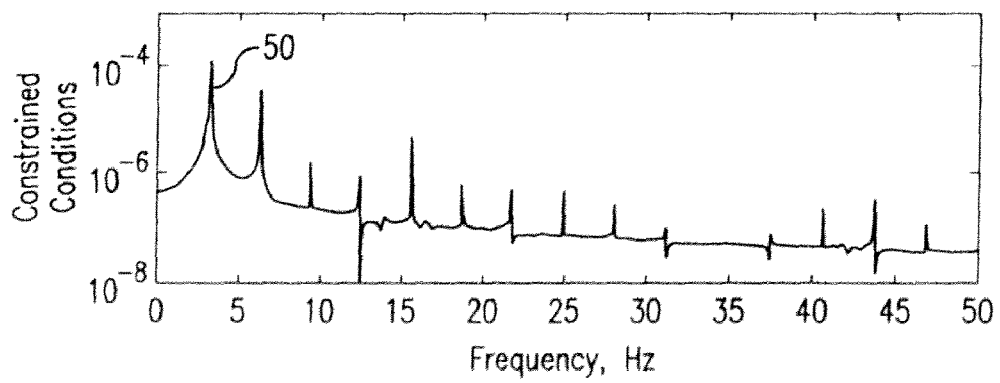
Figure 16B:
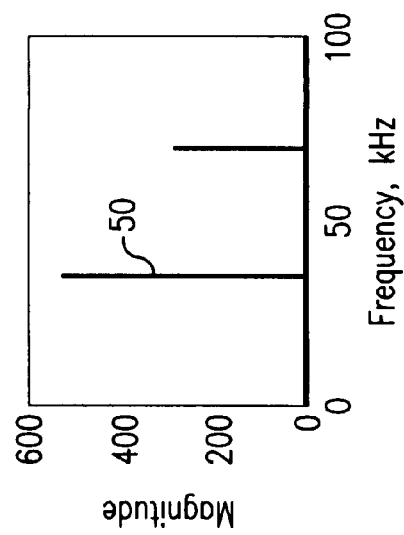
Figure 16C:
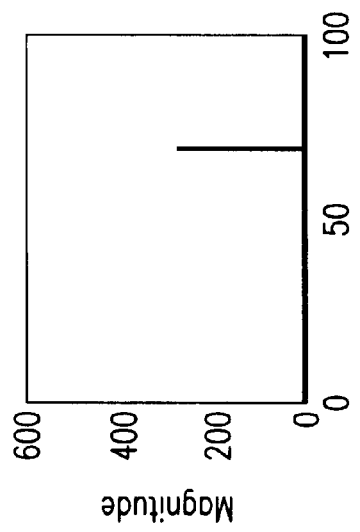
Figure 16D:
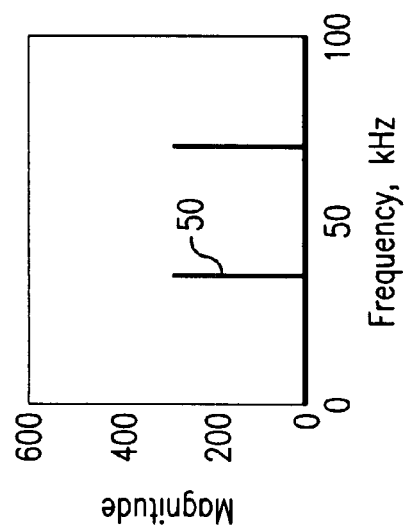

By monitoring the magnitude of the frequency component 50 manifested at v/2, which can be clearly seen in the diagram shown in FIG. 10B, as well as in FIGS. 16B-16D, and by adjusting the system to maintain a desired value for this magnitude representative of the grazing event, small contact force levels may be attained. To accomplish this, the control scheme has been developed, which includes (a) monitoring of the magnitude of the characteristic frequency component manifested at the frequency v/2, and (b) control the system in order to keep this magnitude at the desired value for AFM operation.

Figure 18:
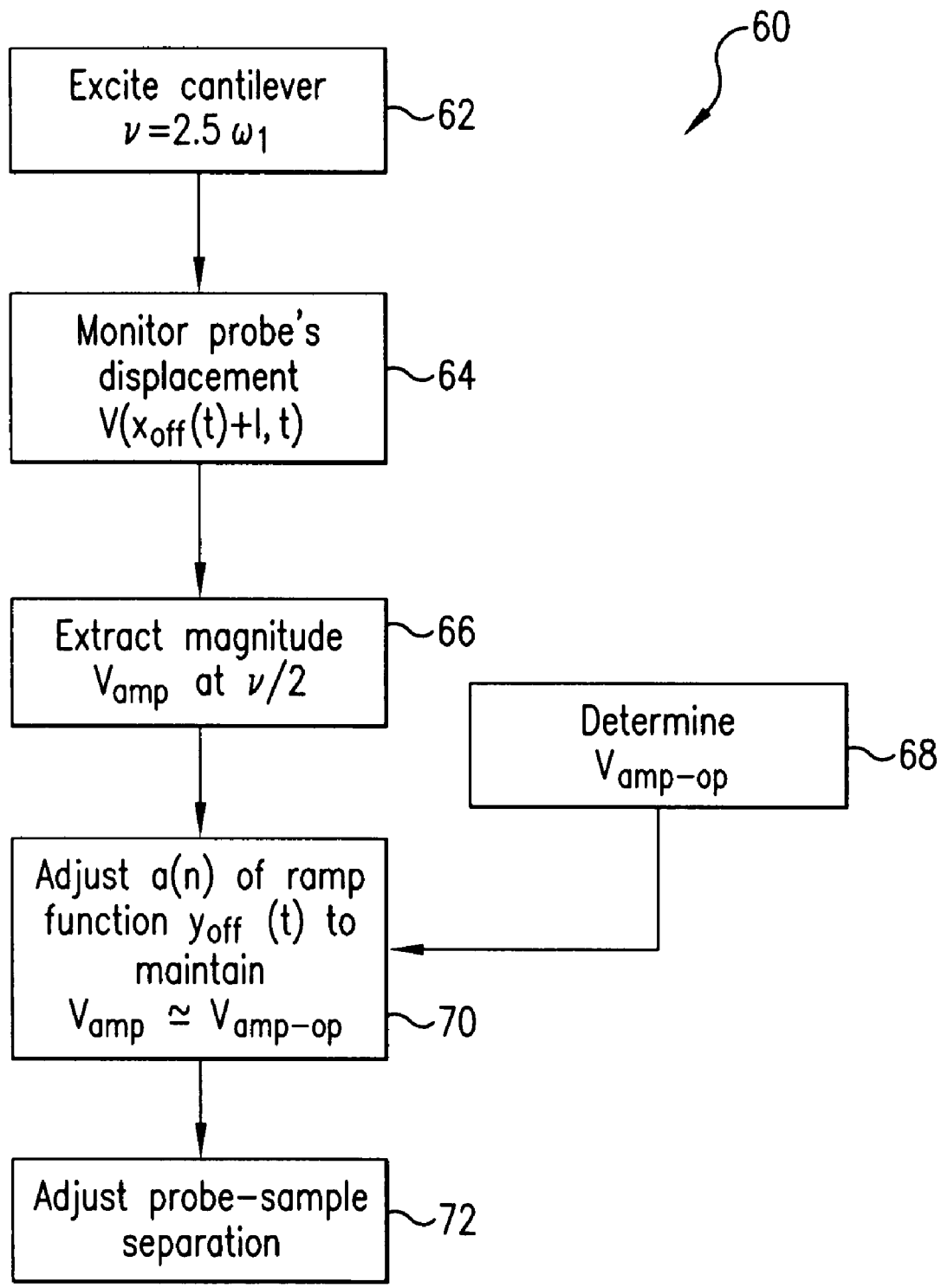
FIG. 18 is a flow chart diagram of the present operating process.

Referring to FIG. 3B, 6 and 18, a flow-chart diagram of the algorithm 60 underlying the operating principles of the present AFM system 30, which runs in the controller 44, as well as in the processor 42, starts in Block 62 to apply the excitation frequency ~2.5 times the probe's first natural frequency to the excitation center at the base 14.

The logic further proceeds to Block 64 to initiate, in real time, data acquisition corresponding to the probe's displacement at the cantilever tip. The probe displacement is sensed by the laser displacement sensor 24 and is measured by the photodiodes. The measurements are supplied to the processor unit 42 so that in Block 66, the algorithm 60 commands the processor unit 42 to operate in conjunction with a monitoring unit 80 to extract the magnitude of the characteristic frequency component (if manifested) at half the excitation frequency, as will be described in detail in conjunction with the diagram of FIGS. 3B and 19.

After the magnitude of the characteristic frequency component is extracted in Block 66, the logic flows to Block 70. Prior to executing the Block 70, the system receives an optimum magnitude value determined in Block 68. The optimum magnitude value is determined experimentally, preferably prior to the operating the AFM system. This value corresponds to the magnitude of the characteristic frequency component indicative of the grazing event.

Based on the real-time magnitude and optimal magnitude of the characteristic frequency component, the processor 42 in conjunction with a servo-control unit 82 calculates adjustment parameters of the actuating signal to control the servo motor to displace the base or the sample stage accordingly in order to attain the probe-sample separation corresponding with the near-grazing mode of operation for the AFM system 30.

Based on the above-identified control concept, the monitoring unit 80 and the servo control unit 82 of the AFM system 30 operate as will be further described. The servo control unit 82 constitutes a portion of the feedback mechanism 46 and includes the servo motor 47 (shown in FIG. 6).

Figure 19:
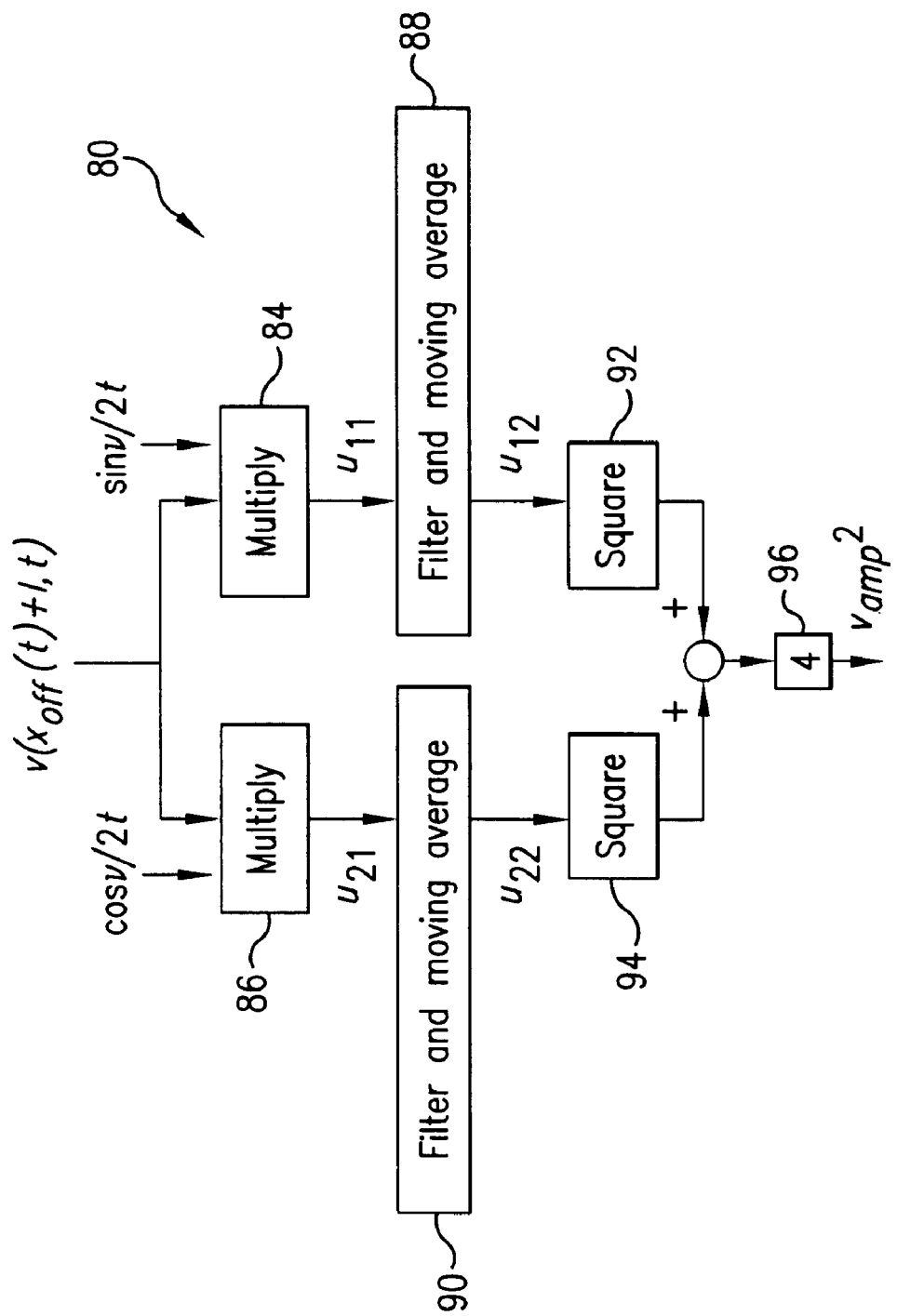
FIG. 19 is a block diagram of the signal processing scheme for monitoring the magnitude of the characteristic frequency component.

Referring to FIGS. 3B, 18, and 19, representing the signal processing scheme for the monitoring unit 80, the measured displacement $V(x_{off}(t)+l,t)$ at the tip of the cantilever probe from the surface of the sample stage (measured in Block 64 of FIG. 18) is supplied to the input of the monitoring unit 80 as commanded in Bock 66 of FIG. 18. The displacement at the tip of the cantilever probe from the surface of the sample stage is a multi-frequency response of the system which can be assumed by Fourier series as:

$$V = \alpha_0 \sin(v_0 t + \phi_0) + \alpha_1 \sin(v_1 t + \phi_1) + \alpha_2 \sin(v_2 t + \phi_2) + \quad \text{(Eq. 6)}$$

where $\alpha_0, \alpha_1, \alpha_2, \ldots$ are the amplitudes of the frequency components, $v_i$ are the frequencies, and $\phi_i$ are the phase differences.

After a filtering is conducted to remove the DC component therefrom, this multi-frequency response is multiplied by sin v/2 and cos v/2 separately in "Multiply" blocks 84 and 86, respectively to produce the signals $u_{11}$ and $u_{21}$ in accordance with Eq. 7 and Eq. 8, respectively $$u_{11} = v \sin v_0 t \quad \text{(Eq. 7)}$$
$$= \frac{\alpha_0}{2}\cos\phi_0 - \frac{\alpha_0}{2}\cos(2v_0 t + \phi_0) -$$
$$\frac{\alpha_j}{2}\cos\{(v_j + v_0)t + \phi_j\} + \frac{\alpha_j}{2}\cos\{(v_j - v_0)t + \phi_j\}$$

$$u_{21} = v \cos v_0 t \quad \text{(Eq. 8)}$$
$$= -\frac{\alpha_0}{2}\sin\phi_0 + \frac{\alpha_0}{2}\sin(2v_0 t + \phi_0) +$$
$$\frac{\alpha_j}{2}\sin\{(v_j + v_0)t + \phi_j\} + \frac{\alpha_j}{2}\sin\{(v_j - v_0)t + \phi_j\},$$

$$j = 1, 2, 3, \ldots$$

A combination of filtering and calculating a moving average is further used to extract the DC components of the signals $u_{11}$, and $u_{21}$. Specifically, in order to obtain the DC component thereof, each signal $u_{11}$ and $u_{21}$ is supplied to a respective low pass filter 88 and 90. With the exception of the first terms of the multiplied signals $u_{11}$, and $u_{21}$, all the terms are periodic. Therefore, the ideal output signal $u_{12}$ and $u_{22}$ from the low pass filter 88 and 90 are presented in Eq. 9 and Eq. 10, respectively.

$$u_{12} = \frac{\alpha_0}{2}\cos\phi_0 \quad \text{(Eq. 9)}$$

$$u_{22} = -\frac{\alpha_0}{2}\sin\phi_0. \quad \text{(Eq. 10)}$$

The output signals $u_{12}$ and $u_{22}$ from the filters 88 and 90, are squared in blocks 92 and 94, respectively, and resulting outputs are summed and multiplied by "4" in the multiplication unit 96 to obtain the squared magnitude $V_{amp}^2$ of the frequency component v/2 of the real-time response $V(x_{off}(t)+l,t)$.

Further, an optimal deflection, e.g., value $V^2_{amp\_op}$ is selected (in Block 68 of FIG. 18) which is an optimal value of $V_{amp}$ at which a beam starts touching the sample (grazing event). The value of the $V_{amp\_op}$ can be determined in advance by an experiment. This optimal value is determined by slowly decreasing the separation distance between the sample surface and the center of oscillation of the probe in correspondence with the principles presented in FIGS. 16B-16D until the system's response begins to change and the magnitude of the frequency component manifested at the v/2, as shown in FIGS. 10B and 16B-16D, begins to manifest significant values.

Analysis of the experimental data presented in the previous paragraphs reveals that in some cases the magnitude of this frequency component becomes significant when the probe begins to interact with the sample, thus identifying a grazing condition.

When the optimal value $V^2_{amp\_op}$ is found, the distance $y_{off}(t)$ between the center of oscillation of the cantilever beam and the surface of the sample stage is adjusted by the servo control unit 82 (in Blocks 70 and 72 of FIG. 18) in order to minimize the difference between the actual value, $V_{amp}(t)^2$, and the desired value $V^2_{amp\_op}$. When this is accomplished, the desired response characteristics (deflection of the tip of the cantilever beam) are maintained, independent of variation in the surface of the sample, thereby maintaining the AFM system in the grazing conditions, e.g., when the probe touches the sample with zero velocity. The near-grazing regime of operation of the tapping mode AFM system 30 provides for a reduced impact force between the probe and the sample.

To allow control over the position of the center of oscillation at the base of the cantilever, the position of the base, $V(x_{off}(t), t)$ is actuated in accordance with:

$$V(x_{off}(t),t)=A\sin vt+y_{off}(t), \quad \text{(Eq. 11)}$$

where A is an excitation amplitude, v is an excitation frequency, and $y_{off}(t)$ is the offset of the center of excitation (as shown in FIG. 3B).

The first term in Eq. 11 produces the harmonic excitation necessary to drive the system and the second term permits the position of the cantilever probe to be tuned in order to maintain $V_{amp}(t)^2$ at the desired value $V^2_{amp\_op}$. The magnitude of amplitude A of the sinusoidal excitation may also be tuned to aid in this process.

To control the position of the cantilever, a ramp function is used for $y_{off}(t)$ in accordance with the Eq. 12:

$$y_{off}(t)=y_{off}(2\pi n/(V/2))+\alpha(n)\tau \quad \text{(Eq. 12)}$$

wherein the value of $y_{off}$ is changed in a period of v/2 by the nonlinear feedback control as will be described further herein, and wherein $\tau=t-n\times(2\pi/(v/2))$ for $0<\tau\leq 2\pi/(v/2)$, n is an integer uniquely determined, and $\alpha(n)$ is a proportion coefficient defined in Eq. 13.

The value of the constant of proportion α is changed in a period of v/2 by nonlinear feedback control as $$\alpha = K_l\left\{V^2_{amp\_op} - V_{amp}\left(\frac{2\pi}{v/2}n\right)^2\right\} + K_n\left\{V^2_{amp\_op} - V_{amp}\left(\frac{2\pi}{v/2}n\right)^2\right\}^3 \quad \text{(Eq. 13)}$$

where $K_l$ and $K_n$ are constants, e.g. $K_l=2.0\times10^{13}$, $K_n=5.0\times10^{13}$.

Figure 20:
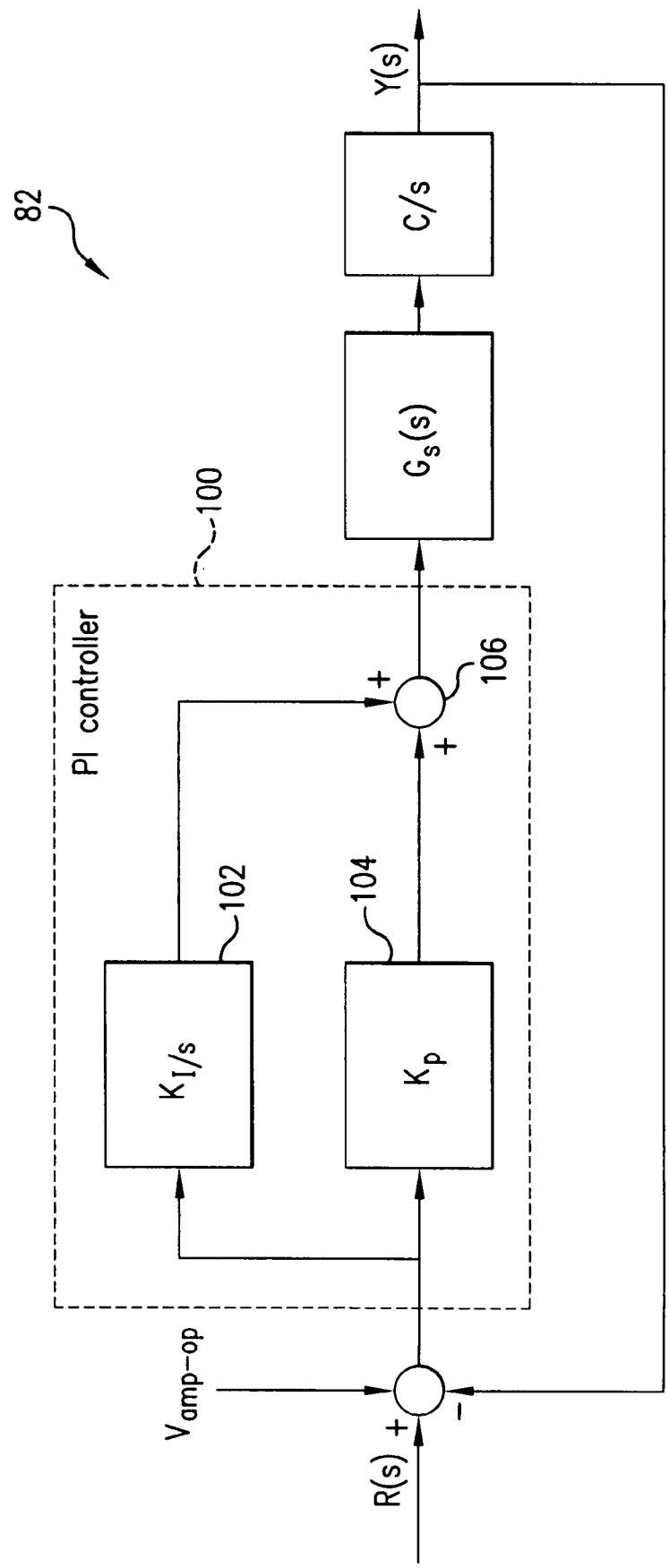
FIG. 20 is a block diagram of the servo control unit.

The servo system presented in FIG. 20 is designed to periodically excite the supporting point (base) of the cantilever and to control the position of the center of the excitation precisely to maintain the AFM system in the near-grazing mode of operation. As defined by Eq. 12, the center of excitation of the supporting point of the cantilever is moved by the ramp function $y_{off}(\tau)$. The constant of proportion α of this ramp function is changed by nonlinear feedback control shown in FIG. 20 to keep the magnitude of the frequency component at v/2 constant for two periods of excitation. The validity of the proposed control method has been confirmed by experimental data.

Referring to FIG. 20, the servo-control unit 82 includes a proportional-integral (PI) controller 100 which is a control loop feedback mechanism which functions to correct a deviation between a measured process variable, e.g. $V(x_{off}(t)+l,t)$ and a desired setpoint, e.g. $V_{amp\_op}$ by calculating and outputting a corrective action that can adjust the operation accordingly. The algorithm underlying the function of the PI controller 100 involves two parameters, e.g. Integral gain $K_I$, (block 102) and Proportional gain $K_p$ (block 104). The Proportional gain $K_p$ determines the reaction of the system to the current errors, while the Integral gain $K_I$ determines the reaction based on the sum of recent errors.

The references $r(t) \equiv V_{off}(x_{off}(t),t)$ is inputted into the PI controller in the form of the signal R(s) which is the Laplace Transform $\alpha(r(t))$. In addition, a desired $V_{amp\_op}$, is also provided to the PI controller 100.

The weighted sum of the Proportional action and Integral action at the node 106 is outputted to a compensator $G_S(s)$ defined by:

$$G_s(s) = \frac{q_2 \cdot S^2 + q_i s + q_o}{s^2 + V^2} \quad \text{(Eq. 14)}$$

The compensator is designed to follow sin vt, wherein $q_i$ are constants, s is the complex Laplace transform variable, and v is an excitation frequency.

The transfer function G(s) of the designed system in FIG. 20 is expressed by Eq. 15 as:

$$\frac{Cq^3_{2s} + (CK_p q_1 + CK_i q_2)s^2 + (CK_p q_0 + CK_i q_1)s + CK_i q_0}{s^4 + CK_p q^3_{2s} + (V^2 + CK_p q_1 + CK_i q_2)s^2 + (CK_p q_0 + CK_i q_1)s + CK_i q_0}, \quad \text{(Eq. 15)}$$

where $K_p$ and $K_I$ are the proportional gain and the integral gain of the PI controller, respectively, and C is a constant obtained by the product of the speed control gain of the AC servo motor and the lead of the ball screw. When the stability of this system is discriminated by using Routh-Hurwitz stability criterion, this system is determined to be stable since the constants $q_i$ can be set to have arbitrary values. The constants $q_i$ may be determined by optimal control.

An experiment has been conducted in which the cantilever beam of l×w×t=421.5 mm×20 mm×0.8 mm was used. A small screw was attached to the tip of the beam. The first natural frequency of the beam with the screw is 2.34 Hz. The stiffness of the object is about 0.9 n/m. The supporting point was excited at 2.5 times a first natural frequency by the AC servo motor which is controlled by RTLinux. The displacement of the tip of the beam and the position of the measurement object were measured by laser sensor and Eddy-current sensor, respectively. The excitation frequency v was 5.85 Hz, the excitation amplitude A was 0.001 m, and the constant of proportion α of ramp function was 0.00001 m/s. It was shown that the desired servo system can follow the ramp function and a sine-wave, where the rated speed of the AC servo motor is 3000 rpm, the rated torque is 0.318 Nm, the speed control gain is 600 rpm/V, and the lead of the ball screw is 0.006 m/r.

In FIG. 20, U(s) is the input to the velocity servo drive for the motor driving the base (or the sample stage) in frequency domain. The ratio C/s relates U(s) to the position V(s) of the base of the cantilever, wherein $Y(s)=\alpha(V(x_{off}(t)+l,s)$ Using the monitoring unit 80 and the servo-control unit 82, the position of the base is adjusted in real-time to maintain the AFM system in the near-grazing mode of operation by changing the constant of proportion $\alpha(n)$ of the ramp function $y_{off}(t)$ by the nonlinear feedback control unit 82 to keep the magnitude of the frequency component of the system response manifested at v/2 to be constant for two periods of excitation.

Although this invention has been described in connection with specific forms and embodiments thereof, it will be appreciated that various modifications other than those discussed above may be resorted to without departing from the spirit or scope of the invention as defined in the appended claims. For example, equivalent elements may be substituted for those specifically shown and described, certain features may be used independently of other features, and in certain cases, particular applications of elements may be reversed or interposed, all without departing from the spirit or scope of the invention as defined in the appended claims.

What is claimed is:

1. A method of operating an Atomic Force Microscope (AFM) system, wherein the AFM system includes a cantilever beam attached to a base at one end thereof and a probe positioned at another end of the cantilever beam, said probe scanning across the surface of a sample under study to produce a response signal changing in accordance with a topographical profile of the sample, the method comprising the steps of:

oscillating the probe at an excitation frequency in a predetermined frequency window distinct from said probe's first natural frequency;

disposing said oscillating probe a separation distance from said sample under study for repetitive collisions of said probe therewith, said probe undergoing at least one grazing event between a "non-collision" state and a "collision" state thereof, wherein in said predetermined frequency window, the generated response signal undergoes grazing bifurcation, and wherein in said "collision" state, said response signal includes a characteristic frequency component;

monitoring a magnitude of said characteristic frequency component of said response signal in real time;

defining a reference magnitude of said characteristic frequency component corresponding to said at least one grazing event; and adjusting said separation distance between said probe and said sample to maintain the magnitude of said characteristic frequency component measured in real time substantially equal to said reference magnitude, thereby reducing impact forces between said probe and said sample during said "collision" state.

2. The method of claim 1, wherein said predetermined frequency window includes the excitation frequency of approximately 2.5 times the first natural frequency of said probe.

3. The method of claim 1, wherein said predetermined frequency window includes the excitation frequency in the range above said probe's first natural frequency and below said probe's second natural frequency.

4. The method of claim 1, wherein said response signal in said "collision" state includes a first frequency component manifested at said excitation frequency and said characteristic frequency component manifested at approximately ½ of said excitation frequency.

5. The method of claim 1, wherein said characteristic frequency component is manifested at approximately ½ of said excitation frequency.

6. The method of claim 1, wherein said step of monitoring said characteristic frequency component of said response signal in real-time includes the steps of:

measuring, in real time, a displacement signal corresponding to displacement of said oscillating probe at said another end of said cantilever beam, and extracting from said displacement signal said magnitude value of said characteristic frequency component manifested at approximately half of said excitation frequency.

7. The method of claim 6, wherein said step of adjusting the separation between said probe and said sample further includes the steps of:

supplying said extracted magnitude value of said characteristic frequency component of said response signal measured in real time and said reference magnitude corresponding to said at least one grazing event to a servo control mechanism, generating, by said servo control mechanism, a ramp function signal having a proportion coefficient, changing said probe-sample separation in accordance with said ramp function signal, while adjusting said proportion coefficient to maintain the AFM system in substantially near-grazing state.

8. The method of claim 7, further including the step of:

applying said ramp function signal to said base of said cantilever beam to actuate said base in accordance therewith.

9. The method of claim 8, wherein said step of changing said probe-sample separation further includes the steps of:

adjusting said proportion coefficient of said ramp function signal by a non-linear feedback control mechanism to maintain said magnitude of said characteristic frequency component of said real time response signal substantially equal to said reference magnitude for at least two periods of excitation.

10. The method of claim 9, wherein said non-linear feedback control mechanism includes a proportional-integral control mechanism.

11. The method of claim 7, further including the step of:

applying said ramp function to a stage supporting said sample to actuate said stage in accordance therewith.

12. The method of claim 1, wherein the step of defining said reference magnitude of the characteristic frequency component further includes the steps of:

oscillating said probe at approximately 2.5 of said probe's first natural frequency, monitoring said characteristic frequency component of said response signal at approximately ½ of said excitation frequency while gradually decreasing said probe-sample separation, and identifying said reference magnitude of said characteristic frequency component as indicative of said at least one grazing event when said characteristic frequency component starts to manifest itself at a predetermined level.

13. A tapping mode Atomic Force Microscope (AFM) system with a reduced impact force, comprising:

a cantilever beam supported by a base at one end and having a probe at another end thereof;

a sample under study supported by a sample stage;

an actuating mechanism translating said probe across the surface of said sample under study;

a control unit controlling a separation distance between said sample under study and said probe for repetitive collisions therebetween, said probe undergoing at least one grazing event between a "non-collision" and "collision" states thereof;

an excitation unit for oscillating said probe at an excitation frequency different than said probe's first natural frequency, wherein at said excitation frequency a generated response signal undergoes a grazing bifurcation, and wherein in said "collision" state of said probe said response signal includes a characteristic frequency component;

a data acquiring unit for collecting said response signal in real time;

a processing unit for processing said real time response signal;

a monitoring unit operatively coupled to said processing unit and operating to monitor a magnitude of said characteristic frequency component of said real time response signal; and a servo-control mechanism of said control unit coupled to said monitoring unit and receiving, at an input thereof, a reference value of a magnitude of the characteristic frequency component corresponding to said at least one grazing event, said servo-control unit being coupled to said processing unit to generate adjustment parameters for adjustment of said probe-sample separation to maintain said magnitude of the characteristic frequency component of said real time response signal substantially at said reference magnitude value, thereby maintaining the AFM system at near-grazing state to reduce impact forces between said probe and said sample.

14. The tapping mode AFM system of claim 13, wherein said excitation unit oscillates said probe at the excitation frequency approximately 2.5 of the probe's first natural frequency.

15. The tapping mode AFM system of claim 13, wherein said monitoring unit monitors said magnitude of said characteristic frequency response at approximately ½ of said excitation frequency.

16. The tapping mode AFM system of claim 13, wherein said servo control mechanism controls the probe-sample separation in accordance with a ramp function signal having a proportional coefficient, and wherein said servo control mechanism includes a non-linear feedback control unit adjusting said proportion coefficient of said ramp function signal to maintain said magnitude of said characteristic frequency component substantially at said reference magnitude value for at least two period of excitation of said probe.

* * * * *